United States Patent
Zhang et al.

(10) Patent No.: US 11,650,426 B2
(45) Date of Patent: May 16, 2023

(54) HOLOGRAPHIC OPTICAL ELEMENTS FOR EYE-TRACKING ILLUMINATION

(71) Applicant: Meta Platforms Technologies, LLC, Menlo Park, CA (US)

(72) Inventors: Qi Zhang, Kirkland, WA (US); Gang Li, Bothell, WA (US); Robin Sharma, Redmond, WA (US); Gregory Olegovic Andreev, Kirkland, WA (US); Andrew John Ouderkirk, Kirkland, WA (US); Karol Constantine Hatzilias, Kenmore, WA (US); Ying Geng, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 227 days.

(21) Appl. No.: 16/854,667

(22) Filed: Apr. 21, 2020

(65) Prior Publication Data
US 2020/0355929 A1 Nov. 12, 2020

Related U.S. Application Data

(60) Provisional application No. 62/845,770, filed on May 9, 2019.

(51) Int. Cl.
*G02B 5/32* (2006.01)
*G02B 27/01* (2006.01)
(Continued)

(52) U.S. Cl.
CPC ........... *G02B 27/0179* (2013.01); *G02B 5/32* (2013.01); *G02B 27/0081* (2013.01);
(Continued)

(58) Field of Classification Search
CPC ................... G02B 5/32; G02B 27/425; G02B 2027/0174; G02B 2027/0187; G02B 27/0179; G03H 2260/12
(Continued)

(56) References Cited

U.S. PATENT DOCUMENTS 5,815,741 A 9/1998 Okuyama et al.
6,064,752 A 5/2000 Rozmus et al.
(Continued)

FOREIGN PATENT DOCUMENTS

| CN | 112470163 A | 3/2021 |
|---|---|---|
| EP | 3797376 A1 | 3/2021 |
| WO | 2019226187 | 11/2019 |

OTHER PUBLICATIONS

U.S. Non-Final Office Action dated Oct. 15, 2019 in U.S. Appl. No. 16/033,099.
(Continued)

*Primary Examiner* — Audrey Y Chang
(74) *Attorney, Agent, or Firm* — Weaver Austin Villeneuve & Sampson LLP

(57) ABSTRACT

Techniques disclosed herein relate generally to eye-tracking in near-eye display systems. One example of an eye illuminator for eye-tracking includes a substrate transparent to visible light, an array of light sources immersed in the substrate and configured to emit infrared light, and a holographic optical element conformally coupled to a surface of the substrate and encapsulated by an encapsulation layer. The holographic optical element is configured to transmit the visible light and diffract the infrared light emitted by the array of light sources to the eye of a user for eye-tracking.

20 Claims, 20 Drawing Sheets

(51) Int. Cl.
  *G02B 27/42*    (2006.01)
  *G02B 27/00*    (2006.01)
  *G03H 1/04*     (2006.01)

(52) U.S. Cl.
  CPC ....... *G02B 27/0172* (2013.01); *G02B 27/425* (2013.01); *G02B 2027/0109* (2013.01); *G02B 2027/0174* (2013.01); *G02B 2027/0178* (2013.01); *G02B 2027/0187* (2013.01); *G03H 1/0402* (2013.01); *G03H 2001/0413* (2013.01); *G03H 2001/0439* (2013.01); *G03H 2223/12* (2013.01); *G03H 2223/24* (2013.01); *G03H 2260/12* (2013.01)

(58) Field of Classification Search
  USPC .......................................................... 359/15
  See application file for complete search history.

(56) References Cited

U.S. PATENT DOCUMENTS

| | | | |
|---|---|---|---|
| 6,354,504 | B1 | 3/2002 | Sabourault |
| 7,519,287 | B2* | 4/2009 | Mok ..................... G03B 15/02 396/155 |
| 9,335,548 | B1 | 5/2016 | Cakmakci et al. |
| 9,759,913 | B2 | 9/2017 | Saarikko et al. |
| 10,495,879 | B1 | 12/2019 | Ahuja et al. |
| 10,788,892 | B2 | 9/2020 | Sharma et al. |
| 11,340,702 | B2 | 5/2022 | Sharma et al. |
| 11,455,031 | B1 | 9/2022 | Robin et al. |
| 2010/0188638 | A1 | 7/2010 | Eberl et al. |
| 2012/0228646 | A1* | 9/2012 | Kuo .................... H01L 25/0753 257/E33.068 |
| 2013/0099675 | A1 | 4/2013 | Ma et al. |
| 2013/0114850 | A1* | 5/2013 | Publicover .......... H04N 5/2256 382/103 |
| 2014/0285862 | A1* | 9/2014 | Song ........................ G02B 5/32 359/30 |
| 2014/0340390 | A1 | 11/2014 | Lanman et al. |
| 2014/0375789 | A1 | 12/2014 | Lou et al. |
| 2015/0097947 | A1 | 4/2015 | Hudman et al. |
| 2015/0177514 | A1 | 6/2015 | Maimone et al. |
| 2015/0310670 | A1 | 10/2015 | Grossinger |
| 2016/0019715 | A1 | 1/2016 | Haddick et al. |
| 2016/0119612 | A1 | 4/2016 | Wu et al. |
| 2016/0259801 | A1 | 9/2016 | Gao |
| 2016/0352071 | A1* | 12/2016 | Hogan ................. H01S 5/1835 |
| 2017/0138571 | A1 | 5/2017 | Chen |
| 2017/0147859 | A1 | 5/2017 | Zhang et al. |
| 2017/0242161 | A1 | 8/2017 | Zhang et al. |
| 2017/0316264 | A1 | 11/2017 | Gustafsson et al. |
| 2018/0020137 | A1 | 1/2018 | Engwall et al. |
| 2018/0136471 | A1 | 5/2018 | Miller et al. |
| 2018/0196265 | A1 | 7/2018 | Bouchier et al. |
| 2018/0292896 | A1 | 10/2018 | Hicks et al. |
| 2019/0025930 | A1* | 1/2019 | Fransson ............ G02B 27/4205 |
| 2019/0265478 | A1 | 8/2019 | Cok et al. |
| 2019/0361523 | A1 | 11/2019 | Sharma et al. |
| 2020/0379561 | A1 | 12/2020 | Sharma et al. |

OTHER PUBLICATIONS

U.S. Final Office Action dated Jan. 27, 2020 in U.S. Appl. No. 16/033,099.
U.S. Advisory Action dated Mar. 25, 2020 in U.S. Appl. No. 16/033,099.
Notice of Allowance dated May 20, 2020 in U.S. Appl. No. 16/033,099.
U.S. Non-Final Office Action dated Jan. 17, 2020 in U.S. Appl. No. 15/997,473.
U.S. Final Office Action dated Jun. 15, 2020 in U.S. Appl. No. 15/997,473.
U.S. Advisory Action dated Sep. 24, 2020 in U.S. Appl. No. 15/997,473.
U.S. Non-Final Office Action dated Oct. 22, 2020 in U.S. Appl. No. 15/997,473.
U.S. Final Office Action dated May 3, 2021 in U.S. Appl. No. 15/997,473.
U.S. Non-Final Office Action dated Sep. 2, 2021 in U.S. Appl. No. 15/997,473.
U.S. Non-Final Office Action dated May 24, 2021 in U.S. Appl. No. 16/998,952.
PCT Application No. PCT/US 18/41842, "International Search Report and Written Opinion", Feb. 15, 2019, 11 pages.
PCT Application No. PCT/US18/41842, "International Preliminary Report of Patentability", Nov. 24, 2020 7 pages.
EP Application No. 18919754.4, "Extended European Search Report", Jun. 9, 2021, 9 pages.
Final Office Action dated Mar. 18, 2022 for U.S. Appl. No. 15/997,473, filed Jun. 4, 2018, 24 pages.
Final Office Action dated Oct. 8, 2021 for U.S. Appl. No. 16/998,952, filed Aug. 20, 2020, 14 pages.
Li Z., et al., "Volume Holographic Spectral Imaging," Proceedings of SPIE—The International Society for Optical Engineering, 2005, 8 pages.
Notice of Allowance dated Jan. 27, 2022 for U.S. Appl. No. 16/998,952, filed Aug. 20, 2020, 5 pages.
Advisory Action dated Jul. 13, 2022 for U.S. Appl. No. 15/997,473, filed Jun. 4, 2018, 7 pages.
Advisory Action dated Dec. 27, 2021 for U.S. Appl. No. 16/998,952, filed Aug. 20, 2020, 4 pages.
Notice of Allowance dated Jul. 22, 2022 for U.S. Appl. No. 15/997,473, filed Jun. 4, 2018, 8 pages.

* cited by examiner

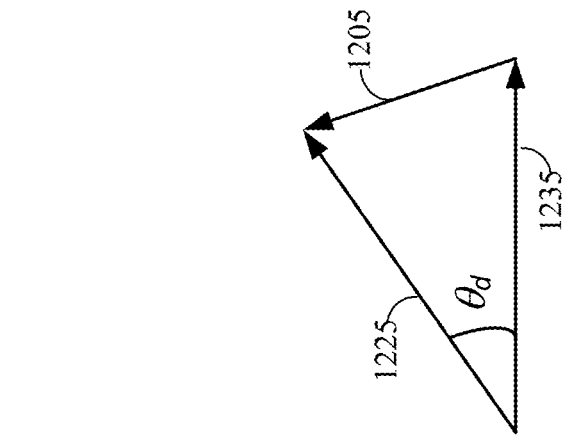
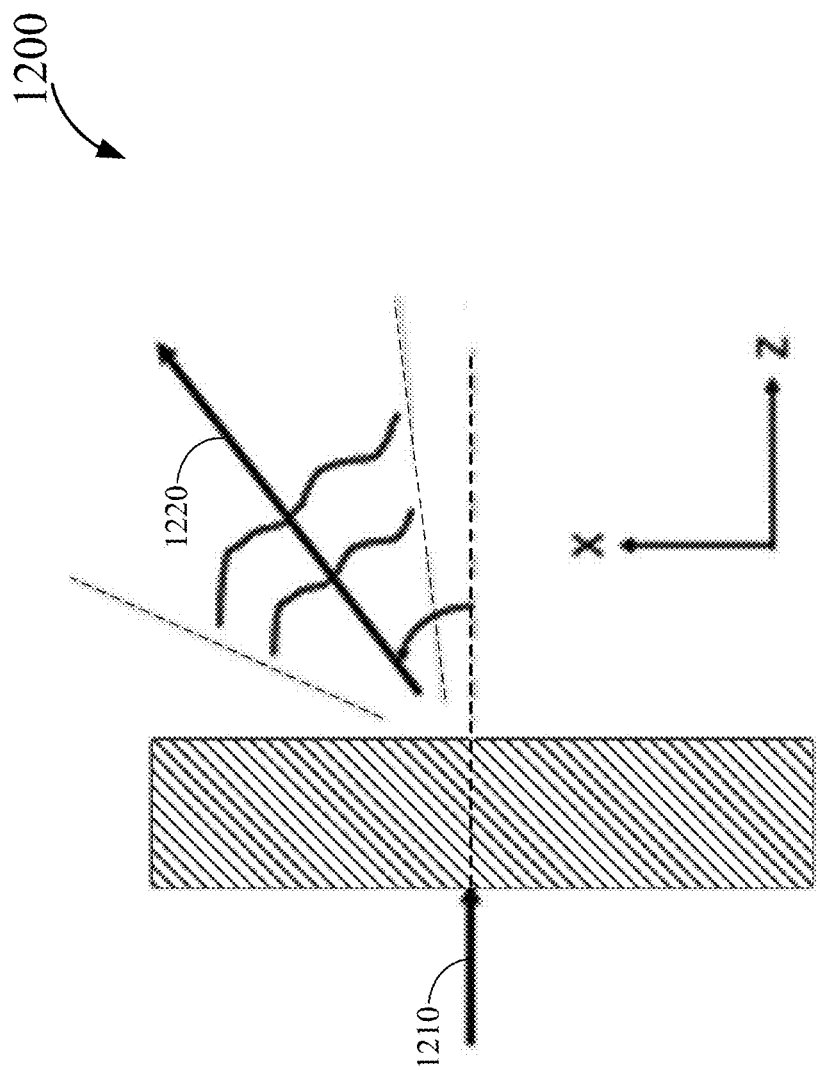
FIG. 12B
FIG. 12A

HOLOGRAPHIC OPTICAL ELEMENTS FOR EYE-TRACKING ILLUMINATION

CROSS-REFERENCE TO RELATED APPLICATION

This patent application claims benefit of and priority to U.S. Provisional Patent Application Ser. No. 62/845,770, filed May 9, 2019, entitled "Holographic Optical Elements For Eye-Tracking Illumination," the disclosure of which is hereby incorporated by reference in its entirety for all purposes.

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

To provide a more immersive artificial reality experience, some artificial reality systems may include an input device for receiving user inputs, such as hand and/or finger movements. Additionally or alternatively, artificial reality systems can employ eye-tracking systems that can track the user's eye (e.g., gaze direction). The artificial reality systems may use the gaze direction information and/or information gained from the input device to modify or generate content based on the direction in which the user is looking, thereby providing a more immersive experience for the user. Eye-tracking systems can also be used for foveated rendering, foveated compression and transmission of image data, alertness monitoring, etc.

SUMMARY

This disclosure relates generally to eye-tracking in near-eye display systems. According to certain embodiments, an eye-illumination system for eye-tracking may include a substrate transparent to visible light and configured to be placed in front of an eye of a user, an array of light sources immersed in the substrate and configured to emit infrared light, and a holographic optical element conformally coupled to a surface of the substrate and encapsulated by an encapsulation layer. The holographic optical element may be configured to transmit the visible light and diffract the infrared light emitted by the array of light sources to the eye of the user for eye-tracking.

In some embodiments, the holographic optical element may include at least one of a holographic grating, a holographic lens, or a holographic diffuser. The holographic optical element may include an array of volume Bragg gratings, where each volume Bragg grating in the array of volume Bragg gratings may correspond to a respective light source in the array of light sources. Each volume Bragg grating in the array of volume Bragg gratings may be characterized by a different respective diffraction angle. In some embodiments, the holographic optical element may be configured to bend a chief ray from a light source in the array of light sources by at least 30°. The holographic optical element may include a photopolymer layer that is configured to be laminated on the surface of the substrate. The substrate and the encapsulation layer may have refractive indexes matching a refractive index of the holographic optical element for the infrared light. In some embodiments, the substrate may include at least one of a glass, quartz, plastic, polymer, ceramic, crystal, or semiconductor substrate, and the surface of the substrate may include a curved or flat surface.

The array of light sources may include a one-dimensional or two dimensional array of vertical-cavity surface-emitting lasers or micro light emitting diodes. In some embodiments, each light source in the array of light sources may be characterized by a linear dimension less than 1 mm, or less than 200 µm. In some embodiments, each light source in the array of light sources may be characterized by an emission cone with an angle less than 40°. In some embodiments, the holographic optical element may be configured to expand the emission cone of a light source in the array of light sources to at least 50°.

According to some embodiments, an eye illuminator for eye-tracking may include an array of light sources configured to emit infrared light, a first encapsulating layer encapsulating the array of light sources, and a holographic optical element conformally coupled to a surface of the first encapsulation layer. The holographic optical element may be configured to diffract the infrared light emitted by the array of light sources to an eye of a user for eye-tracking. In some embodiments, the eye illuminator for eye-tracking may also include a second encapsulating layer encapsulating the holographic optical element.

In some embodiments, the holographic optical element may include a holographic grating, a holographic lens, or a holographic diffuser. In some embodiments, a distance between the holographic optical element and the array of light sources may be less than 1 mm. In some embodiments, each light source in the array of light sources may be characterized by a linear dimension less than 200 µm. In some embodiments, each light source in the array of light sources may be characterized by an emission cone with an angle less than 40°; and the holographic optical element may be configured to expand the emission cone of a light source in the array of light sources to at least 50°. In some embodiments, the holographic optical element may be configured to bend a chief ray from a light source in the array of light sources by at least 30°. In some embodiments, the first encapsulation layer and the second encapsulation layer may have refractive indexes matching a refractive index of the holographic optical element for the infrared light.

According to certain embodiments, a method of fabricating an eye illuminator for eye-tracking may include bonding an array of light sources on a transparent substrate, the array of light sources configured to emit infrared light, encapsulating the array of light sources with a first encapsulation layer, forming a holographic layer on a surface of the first encapsulation layer, forming a second encapsulation layer on the holographic layer, and recording one or more holographic optical elements in the holographic layer. The one or more holographic optical elements may be aligned with the array of light sources and may be configured to diffract the infrared light emitted by the array of light sources to an eye of a user.

In some embodiments, the first encapsulation layer and the second encapsulation layer may have refractive indexes matching a refractive index of the holographic layer for the infrared light. In some embodiments, recording the one or more holographic optical elements in the holographic layer may include recording the one or more holographic optical elements using visible light. In some embodiments, recording the one or more holographic optical elements in the holographic layer may include recording at least one of a holographic grating, a holographic lens, or a holographic diffuser in the holographic layer. In some embodiments, recording the one or more holographic optical elements in the holographic layer may include recording each of the one or more holographic optical elements under a respective recording condition. In some embodiments, each light source in the array of light sources may be characterized by a linear dimension less than 200 μm. The holographic layer may include a photopolymer layer configured to be laminated on the surface of the first encapsulation layer. In some embodiments, recording the one or more holographic optical elements in the holographic layer may be performed before forming the holographic layer on the surface of the first encapsulation layer.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 12A illustrates an example of a volume Bragg grating for directing light from a light source to the user's eye according to certain embodiments. FIG. 12B illustrates the Bragg condition for the volume Bragg grating shown in FIG. 12A.

Figure 1:
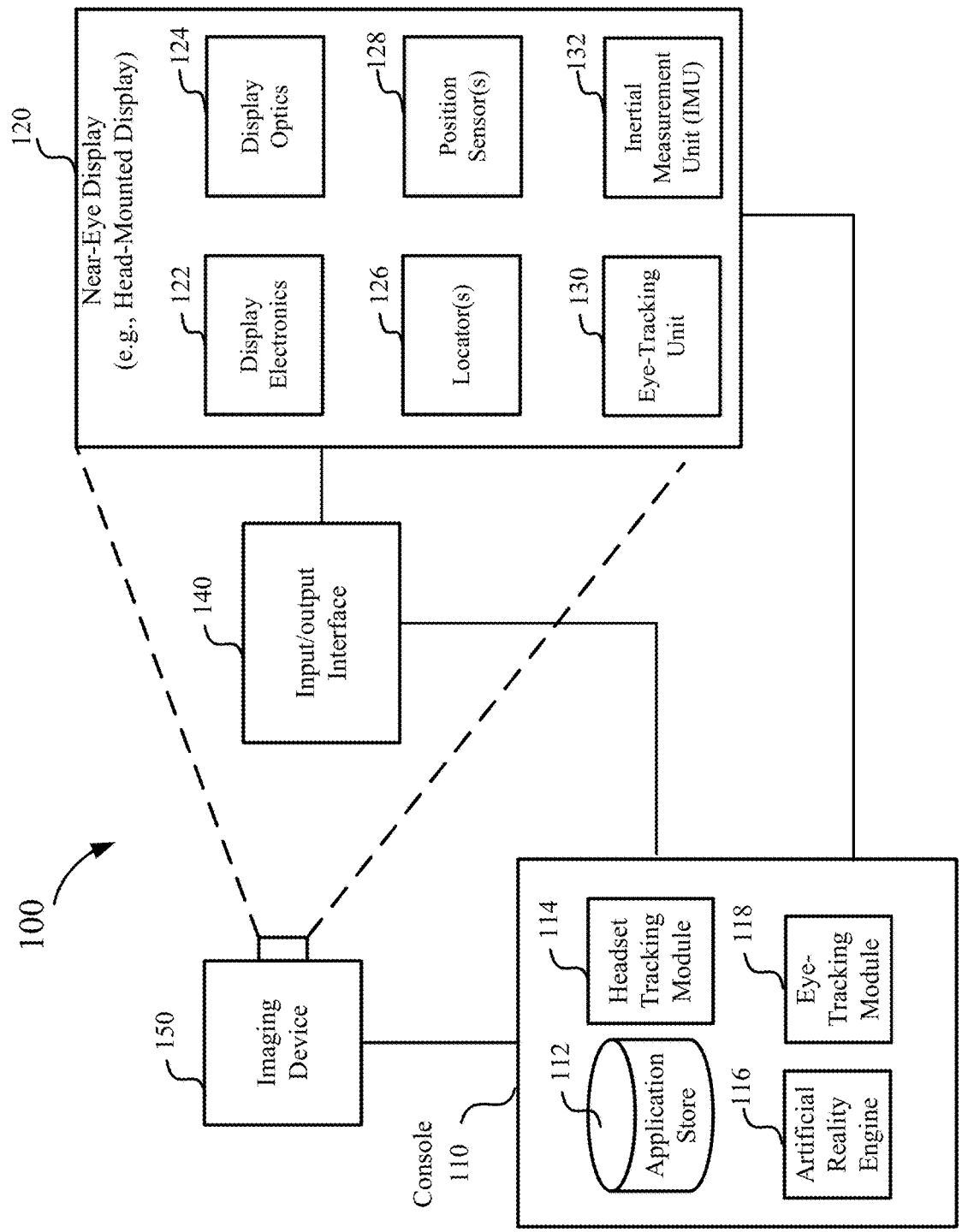
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to artificial reality systems, and more specifically, to eye-tracking subsystems for artificial reality systems. According to certain embodiments, an eye-tracking subsystem for an artificial reality system may include an eye illuminator. The eye illuminator may include a substrate transparent to visible light and infrared light and configured to be placed in front of an eye of a user of the near-eye display. The eye illuminator may also include an array of light sources immersed in the substrate and configured to emit the infrared light. The eye illuminator may further include a holographic optical element conformally coupled to a surface of the substrate and encapsulated by an encapsulation layer, where the holographic optical element may be configured to transmit the visible light and diffract the infrared light emitted by the array of light sources to the eye of the user for eye-tracking. Various inventive embodiments are described herein, including systems, modules, devices, components, methods, and the like.

In an artificial reality system, such as a virtual reality (VR), augmented reality (AR), or mixed reality (MR) system, to improve user interaction with presented content, the artificial reality system may track the user's eye and modify or generate content based on a location or a direction in which the user is looking. Tracking the eye may include tracking the position and/or shape of the pupil and/or the cornea of the eye, and determining the rotational position or gaze direction of the eye. To track the eye, an eye-tracking system of the near-eye display system may include an illumination subsystem that can illuminate the user's eye, using light sources mounted to or inside the artificial reality system. The eye-tracking system may also include an imaging subsystem that includes an imaging device (e.g., a camera) for capturing light reflected by various surfaces of the user's eye. Light that is diffusively reflected (e.g., scattered) by, for example, the iris of the user's eye may affect the contrast of the captured image in the iris or pupil region, which may be used to determine the edges of the iris or pupil and the center of the pupil. Light that is reflected specularly off the cornea of the user's eye may result in "glints" in the captured image. The glints may also be referred to as the first Purkinje images or corneal reflections. Techniques such as centroiding algorithms may be used to determine the locations of the glints on the eye in the captured image. For example, the centroiding algorithm may determine the center of the glint by finding the pixel location with the most energy in a local neighborhood. The rotational position (e.g., the gaze direction) of the eye may then be determined based on the locations of the glints relative to a known feature of the eye (e.g., the center of the pupil) within the captured image.

In the illumination subsystem, one or more light sources (e.g., LEDs) may be positioned at the periphery of the user's field of view (e.g., along the circumference of the viewing optics or on a frame of the near-eye display system) to provide light for illuminating the user's eye. In the imaging subsystem, one or more imaging devices (e.g., cameras) may also be placed at the periphery of the user's field of view. In many applications, the viewing direction (e.g., gazing angle) may need to be determined with a high accuracy, such as less than 5°, less than 1°, or better. The eye-tracking system may also need to be robust in order to accommodate for extreme changes in the viewing direction and variations in facial features surrounding the user's eyes, such as cases where portions of the eye, including portions of the iris or the pupil, may be obscured by, for example, eyelids or eye lashes.

According to certain embodiments disclosed herein, an eye-illumination subsystem of an eye-tracking system may include a substrate, a plurality of light sources on the substrate and configured to emit illumination light (e.g., infrared (IR) light, such as near-infrared (NIR) light), and a plurality of holographic optical elements (HOEs) configured to direct the illumination light emitted from the plurality of light sources to an eye of a user, where the plurality of light sources and/or the plurality of HOEs may be immersed in encapsulation materials. The substrate may be transparent to visible light and IR light. The encapsulation materials may also be transparent to visible light and IR light. The plurality of light sources may emit IR (e.g., NIR) light and may each be characterized by a linear dimension less than, for example, about 200 µm, such as less than about 100 µm, about 50 µm, about 20 µm, about 10 µm, about 5 µm, about 2 µm, or about 1 µm. Therefore, the plurality of light sources may not be visible to the user's eye and thus can be placed in the field of view of the user's eye. The HOEs may also be transparent to visible light, and thus can also be placed in the field of view of the user's eye, such as being conformally laminated on the substrate or on the encapsulated light sources. In some embodiments, the HOEs may be recorded, using light of a first wavelength (e.g., visible light) that is different from the illumination light used for eye-tracking. The plurality of light sources in front of the user's eye may help to avoid light obscurations and improve the accuracy and reliability of the eye-tracking. The HOEs may help to more efficiently direct illumination light from the plurality of light sources in front of the user's eye to the user's eye to further improve the accuracy and reliability of the eye-tracking.

As used herein, visible light may refer to light with a wavelength between about 380 nm and about 750 nm, between about 400 nm and about 700 nm, or between about 440 nm and about 650 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS), a charge-coupled device (CCD) sensor, or an InGaAs sensor), such as between 830 nm and 860 nm, between 930 nm and 980 nm, or between about 750 nm to about 1000 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material.

The transmission rate (i.e., transmissivity) may be represented by either a photopically weighted or unweighted average transmission rate over a range of wavelengths, or the lowest transmission rate over a range of wavelengths, such as the visible wavelength range.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional imaging device 150, and an optional input/output interface 140 that may each be coupled to an optional console 110. While FIG. 1 shows example artificial reality system environment 100 including one near-eye display system 120, one imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include imaging device 150, optional input/output interface 140, and optional console 110. In alternative configurations, different or additional components may be included in artificial reality system environment 100. In some configurations, near-eye display systems 120 may include imaging device 150, which may be used to track one or more input/output devices (e.g., input/output interface 140), such as a handheld controller.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

Imaging device 150 may be part of near-eye display system 120 or may be external to near-eye display system 120. Imaging device 150 may generate slow calibration data based on calibration parameters received from console 110. Slow calibration data may include one or more images showing observed positions of locators 126 that are detectable by imaging device 150. Imaging device 150 may include one or more cameras, one or more video cameras, any other device capable of capturing images including one or more of locators 126, or some combinations thereof. Additionally, imaging device 150 may include one or more filters (e.g., to increase signal to noise ratio). Imaging device 150 may be configured to detect light emitted or reflected from locators 126 in a field of view of imaging device 150. In embodiments where locators 126 include passive elements (e.g., retroreflectors), imaging device 150 may include a light source that illuminates some or all of locators 126, which may retro-reflect the light to the light source in imaging device 150. Slow calibration data may be communicated from imaging device 150 to console 110, and imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye-tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

In some embodiments, eye-tracking system 130 may include one light emitter and one camera to track each of the user's eyes. Eye-tracking system 130 may also include different eye-tracking systems that operate together to provide improved eye-tracking accuracy and responsiveness. For example, eye-tracking system 130 may include a fast eye-tracking system with a fast response time and a slow eye-tracking system with a slower response time. The fast eye-tracking system may frequently measure an eye to capture data used by an eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately $-1°$ to $8°$ laterally and about $\pm 4°$ vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system, due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transformation or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), perform some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, imaging device 150 may be used to track input/output interface 140, such as tracking the location or position of a controller (which may include, for example, an IR light source) or a hand of the user to determine the motion of the user. In some embodiments, near-eye display 120 may include one or more imaging devices (e.g., imaging device 150) to track input/output interface 140, such as tracking the location or position of a controller or a hand of the user to determine the motion of the user.

Console 110 may provide content to near-eye display system 120 for presentation to the user in accordance with information received from one or more of imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback applications, or other suitable applications.

Headset tracking module 114 may track movements of near-eye display system 120 using slow calibration information from imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100, using one or more calibration parameters, and may adjust one or more calibration parameters to reduce errors in determining the position of near-eye display system 120. For example, headset tracking module 114 may adjust the focus of imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., imaging device 150 loses line of sight of at least a threshold number of locators 126), headset tracking module 114 may recalibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye-tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
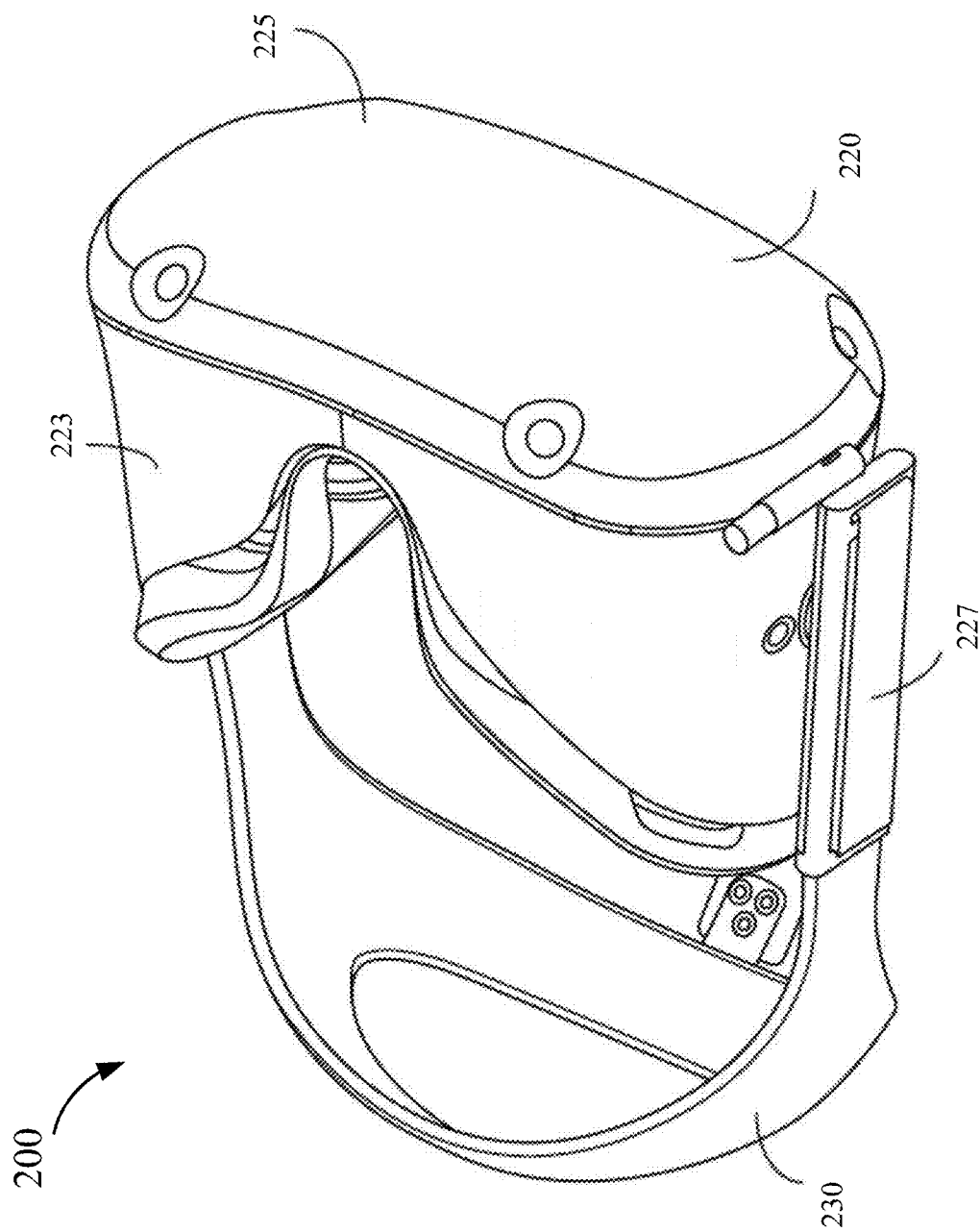
FIG. 2 is a perspective view of an example of a near-eye display system in the form of a head-mounted display (HMD) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye-tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
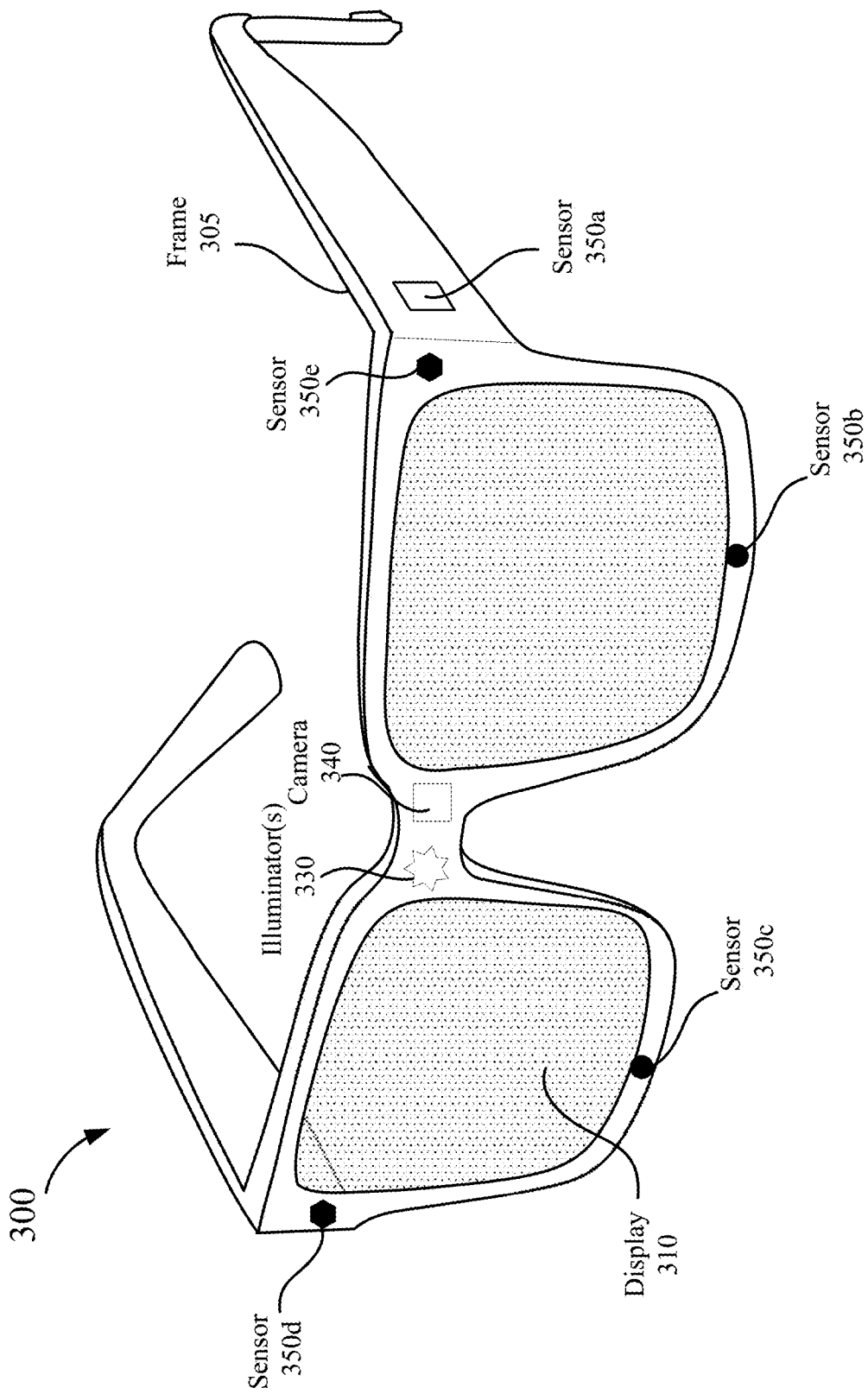
FIG. 3 is a perspective view of an example of a near-eye display system in the form of a pair of glasses for implementing some of the examples disclosed herein.

FIG. 3 is a perspective view of an example of a near-eye display system 300 in the form of a pair of glasses for implementing some of the examples disclosed herein. Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display system 300, and/or to provide an interactive VR/AR/MR experience to a user of near-eye display system 300. In some embodiments, sensors 350*a*-350*e* may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350*a*-350*e* in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
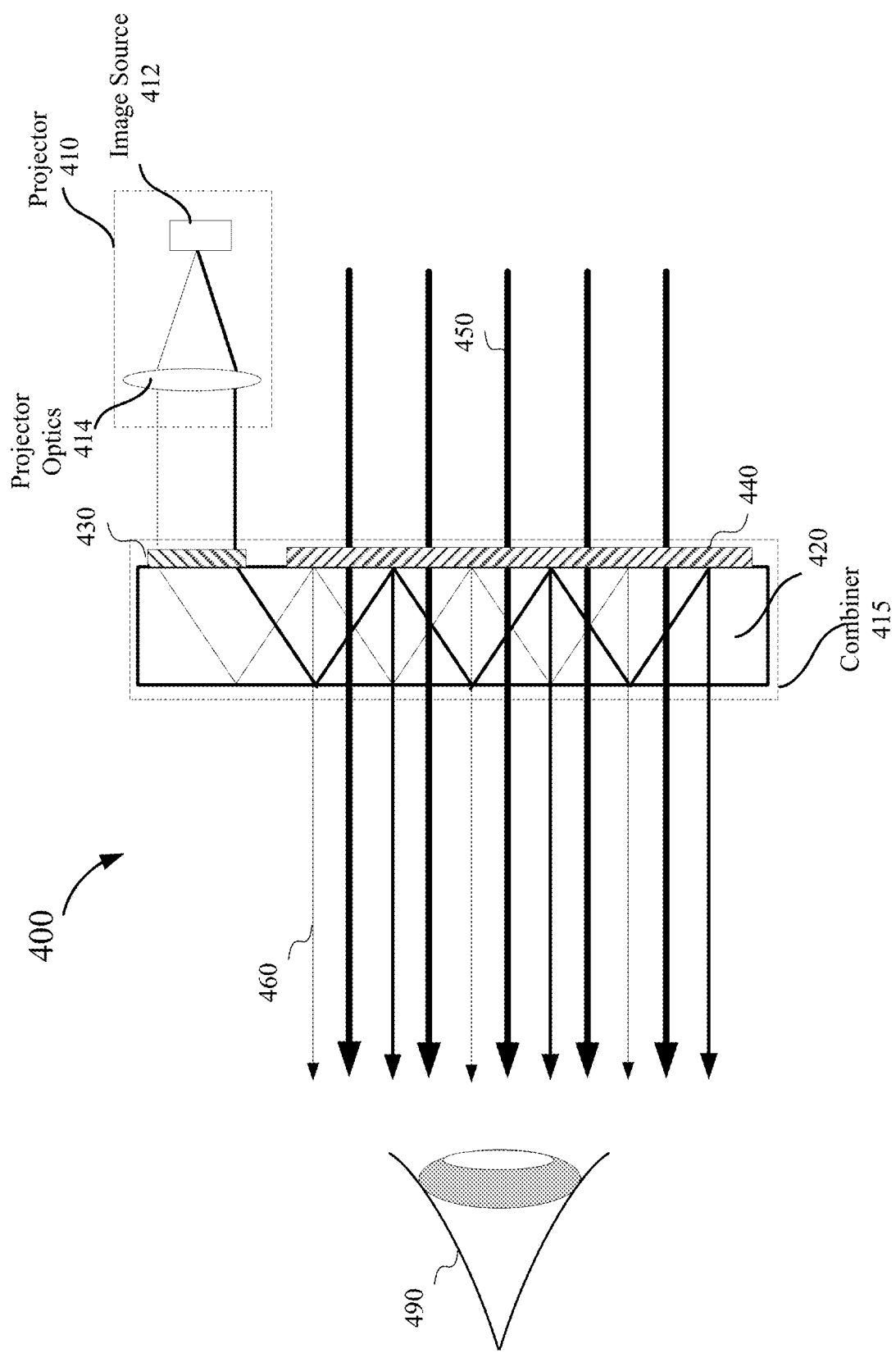
FIG. 4 illustrates an example of an optical see-through augmented reality system using a waveguide display that includes an optical combiner according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources, each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As with input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

There may be several types of eye measurements for determining user intent, cognitive processes, behavior, attention, etc. These measurements may include, for example, measurement related to fixations, where the eyes are stationary between movements and visual input may occur. Fixation-related measurement variables may include, for example, total fixation duration, mean fixation duration, fixation spatial density, number of areas fixated, fixation sequences, and fixation rate. The eye measurements may also include measurements of saccades, which are rapid eye movements that occur between fixations. Saccade related parameters may include, for example, saccade number, amplitude, velocity, acceleration, and fixation-saccade ratio. The eye measurements may also include measurements of scanpath, which may include a series of short fixations and saccades alternating before the eyes reach a target location on the display screen. Movement measures derived from the scanpath may include, for example, scanpath direction, duration, length, and area covered. The eye movement measurements may further include measuring the sum of all fixations made in an area of interest before the eyes leave that area or the proportion of time spent in each area. The eye measurements may also include measuring pupil size and blink rate, which may be used to study cognitive workload.

In addition, as described above, in an artificial reality system, to improve user interaction with presented content, the artificial reality system may track the user's eye and modify or generate content based on a location or a direction in which the user is looking. Tracking the eye may include tracking the position and/or shape of the pupil and/or the cornea of the eye, and determining the rotational position or gaze direction of the eye. One technique referred to as Pupil Center Corneal Reflection (PCCR) method involves using NIR LEDs to produce glints on the eye cornea surface and then capturing images/videos of the eye region. Gaze direction can be estimated from the relative movement between the pupil center and glints.

Figure 5:
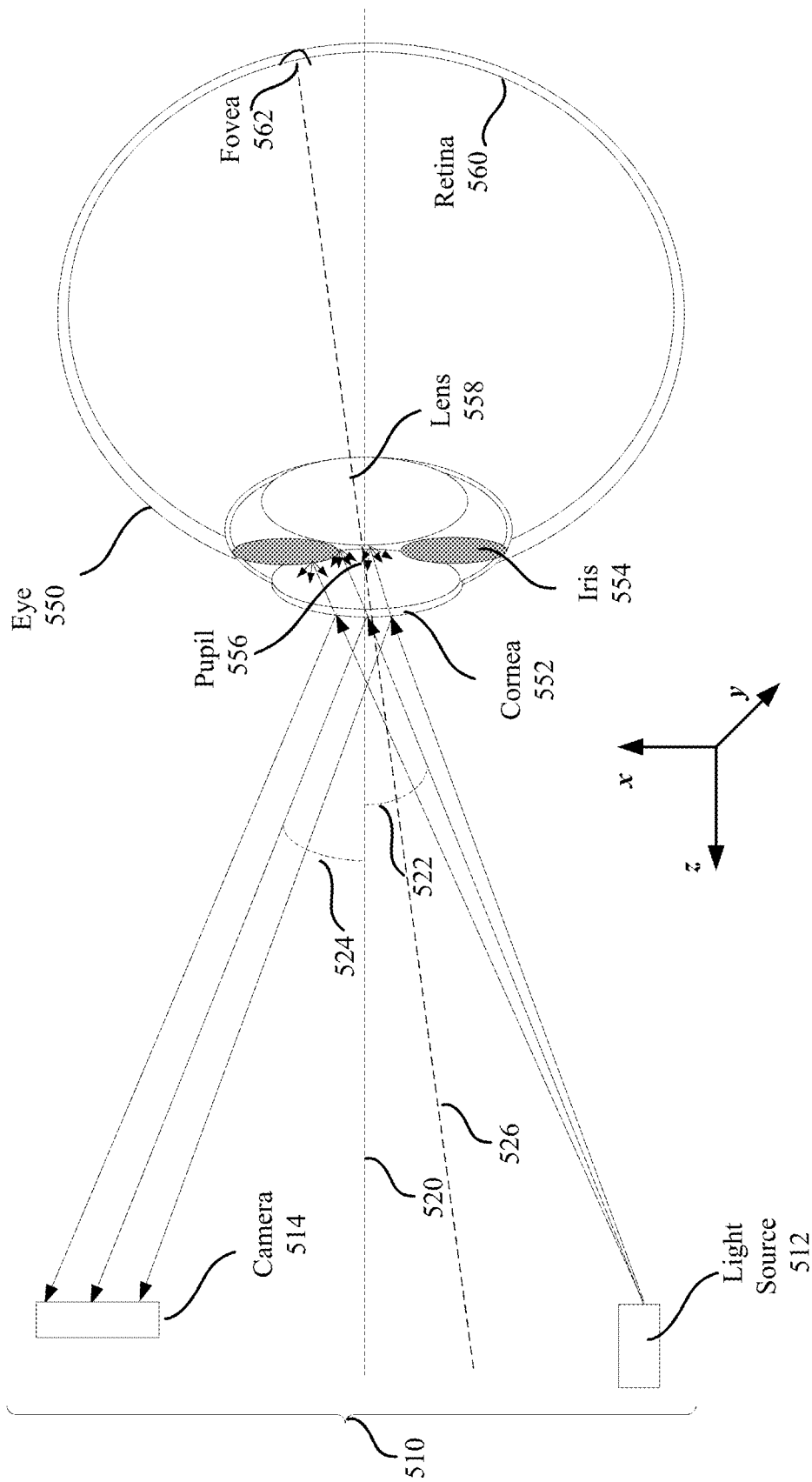
FIG. 5 illustrates light reflections and scattering by an eye during eye-tracking.

FIG. 5 illustrates light reflections and scattering by an eye 550 during eye-tracking using an eye-tracking system 510, such as eye-tracking system 130. Eye-tracking system 510 may include a light source 512 and a camera 514 as described above, where light source 512 and camera 514 may be attached to or embedded in, for example, the body of a near-eye display described above. For example, light source 512 and camera 514 may be positioned in the periphery of the field of view of the user's eye, such as in the frame of the near-eye display, such that they may not affect the user's view of the display image or the surrounding environment. In some embodiments, eye-tracking system 510 may include different and/or additional components than those depicted in FIG. 5. Light source 512 may include, for example, a laser, an LED, a micro-LED, or vertical-cavity surface-emitting lasers (VCSELs), and may be mounted at an angle 522 relative to a surface normal vector 520 of eye 550. Surface normal vector 520 is orthogonal to a portion of the surface (e.g., cornea 552) of eye 550 illuminated by light source 512. In the example shown in FIG. 5, surface normal vector 520 may be the same as the pupillary axis (also referred to as optical axis, which may be a line passing through the center of pupil 556 and the center of cornea 552) of eye 550. Angle 522 may be measured between surface normal vector 520 and a line from a center of the portion of the surface of eye 550 illuminated by light source 512 to a center of the output aperture of light source 512. Camera 514 may be mounted at a camera angle 524 relative to surface normal vector 520 of eye 550. Camera angle 524 may be measured between surface normal vector 520 and a line from a center of the portion of the surface of eye 550 illuminated by light source 512 to a center of the image sensor or light input aperture of camera 514. In some embodiments, a difference between angle 522 and camera angle 524 is less than a threshold amount so that camera 514 may capture images via specular reflections of light incident on cornea 552 of eye 550, which may beneficially increase contrast of the resulting image and minimize light power loss and power consumption.

The light emitted by light source 512 may substantially uniformly illuminate a portion of the eye surface (e.g., cornea 552). A portion of the emitted light may be reflected specularly by cornea 552 of eye 550 and captured by camera 514. In some cases, the light incident on eye 550 may propagate into the eye for a small distance before being reflected. For example, at least some portions of the light may enter eye 550 through cornea 552 and reach iris 554, pupil 556, lens 558, or retina 560 of eye 550. Because some interfaces within eye 550 (e.g., surface of iris 554) may be rough (e.g., due to features such as capillaries or bumps), the interfaces within eye 550 may scatter the incident light in multiple directions. Different portions of the eye surface and the interfaces within eye 550 may have different patterns of features. Thus, an intensity pattern of the light reflected by eye 550 may depend on the pattern of features within the illuminated portion of eye 550, which may allow identification of the portions of the eye (e.g., iris 554 or pupil 556) from the intensity pattern.

Camera 514 may collect and project light reflected by the illuminated portion of eye 550 onto an image sensor of camera 514. Camera 514 may also correct one or more optical errors (such as those described with respect to display optics 124) to improve the contrast and other properties of the images captured by the image sensor of camera 514. In some embodiments, camera 514 may also magnify the reflected light. In some embodiments, camera 514 may enlarge the images. The image sensor of camera 514 may capture incident light focused by a lens assembly of camera 514. Thus, camera 514 may effectively capture an image of light source 512 (the emitted light of which is reflected specularly by the cornea of the eye) reflected by the eye, resulting in a "glint" in the captured image. Because of the scattering (diffusive reflections) at some interfaces of the eye, light incident on a point of the image sensor may include light reflected from multiple points within the illuminated portion of eye 550, and thus may be the result of the interference of the light reflected from the multiple points. Thus, in some embodiments, the image sensor of camera 514 may also capture a diffraction or speckle pattern formed by a combination of light reflected from multiple points of the surface of eye 550.

Each pixel of the image sensor may include a light-sensitive circuit that can output a current or voltage signal corresponding to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 514 may include a complementary metal-oxide semiconductor (CMOS) pixel array, which may be used with light having a wavelength less than about 750 nm. As another example, the image sensor of camera 514 may include an indium gallium arsenide (InGaAs) alloy pixel array or a charge-coupled device (CCD). Such an image sensor may be used with a laser emitting light having a wavelength between about 900 nm and about 1160 nm.

In some embodiments, to determine a position change of eye 550, an eye-tracking module (e.g., eye-tracking system 130 or eye-tracking module 118 of FIG. 1) may determine a pixel shift between images. Multiplying the pixel shift by a calibrated distance per pixel may allow the eye-tracking module to determine a distance the surface (e.g., cornea 552) of eye 550 has shifted. For example, if the glint captured in one image is shifted by two pixels relative to the glint captured in a previous image, and each pixel corresponds to a distance of 10 micrometers at the surface of eye 550, the surface of eye 550 may have moved about 20 micrometers.

In some embodiments, eye-tracking techniques used in head-mounted devices may be video-based and may be performed based on appearance or features. For example, the appearance-based techniques may use certain mapping functions to map the entire eye image or a region of interest of the eye image to a gaze direction or point-of-gaze. The mapping function may have a high-dimensional input (e.g., the intensities of image pixels) and a low-dimensional output (e.g., the gaze direction, point-of-gaze, etc.). These mapping functions may be based on machine learning models, such as convolutional neural networks (CNNs).

The feature-based techniques may perform feature extraction and gaze estimation using the extracted features. The features can be any one or more of the following: pupil center, iris center, pupil-iris boundary, iris-sclera boundary, first Purkinje images (reflections off the front surface of the cornea, known as corneal reflections or glints), fourth Purkinje images (reflections of the back surface of the crystalline lens), eye corners, and the like. These features may be extracted using computer vision techniques (e.g., intensity histogram analysis, thresholding, edge detection, blob segmentation, convex-hull, morphological operations, shape fitting, deformable templates, centroiding, etc.) or machine-learning techniques, or any combination. The gaze estimation techniques can be interpolation-based or model-based. The interpolation-based techniques may use certain mapping functions (e.g., second degree bivariate polynomial) to map eye features (e.g., pupil center or pupil center-corneal reflection (PCCR) vector) to the gaze direction. The coefficients of these mapping functions may be obtained through a personal calibration procedure that may involve collecting data while the user fixates at a sequence of fixation targets with known coordinates. This calibration may be performed for each subject and each session, and may sometimes be performed multiple times in each session, because the calibration may be sensitive to slippage of the head-mounted device relative to the head. The mapping functions may then use the calibration data points and interpolation techniques to determine the gaze direction. The model-based methods may use models of the system (e.g., camera(s) and/or light source(s)) and the eye that may include actual physical system parameters and anatomical eye parameters to determine a 3-D gaze from a set of eye features (e.g., pupil boundary and multiple corneal reflections) according to 3-D geometry. Model-based techniques may perform both a one-time system calibration and a one-time personal calibration for each user. The data collection procedure for the personal calibration may be similar to that of the interpolation-based methods.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 550, such as the pupil or the iris. For example, the eye-tracking module may determine the eye position by retrieving a reference eye position associated with the feature (which was also captured in a reference image), determining a pixel shift between the feature in the captured image and the feature in the reference image, and determining the eye position based on the determined pixel shift with respect to the reference eye position and the calibrated distance per pixel as described above.

As discussed above, camera 514 may effectively capture an image of light source 512 reflected by cornea 552 of eye 550. In some embodiments, the eye-tracking module may determine a gaze direction of the user's eye based on the locations of the images of the light sources (e.g., glints) on cornea 552 in the captured image. The gaze direction may be determined by a foveal axis 526 of the user's eyes, where foveal axis 526 (also referred to as "visual axis") may be a line passing through the center of pupil 556 and the center of fovea 562.

Figure 6:
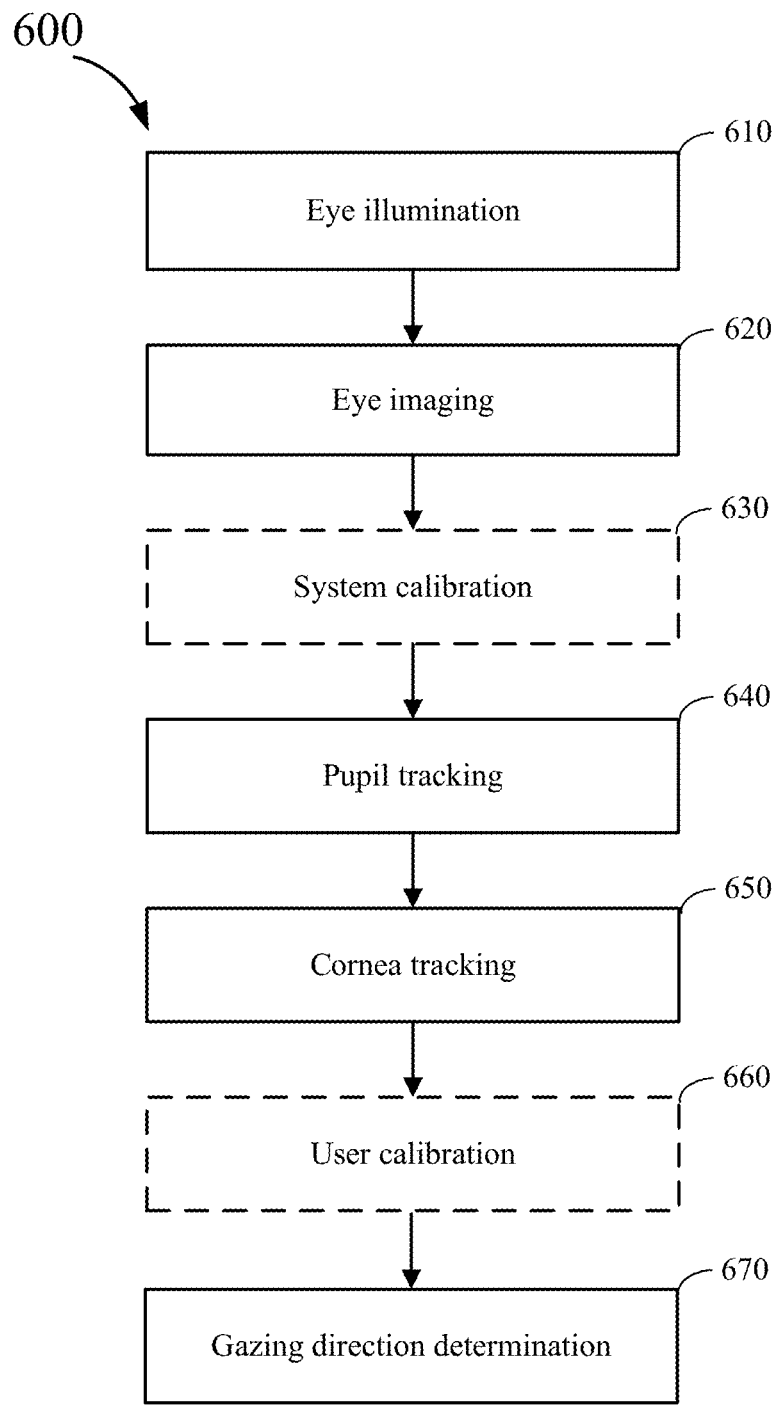
FIG. 6 is a simplified flow chart illustrating an example of a method for tracking the eye of a user of a near-eye display system according to certain embodiments.

FIG. 6 is a simplified flow chart 600 illustrating an example of a method for tracking the eye of a user of a near-eye display system according to certain embodiments. The operations in flow chart 600 may be performed by, for example, eye-tracking system 130 or 510 described above. At block 610, one or more light sources may illuminate the user's eye. In various embodiments, the light sources may be located in the field of view of the user's eye or at a periphery of the field of view of the user's eye. In some embodiments, a light source may be located at the periphery of the field of view of the user's eye, and the light from the light source may be guided and directed to the user's eye from locations in the field of view of the user's eye.

At block 620, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figure 7B:
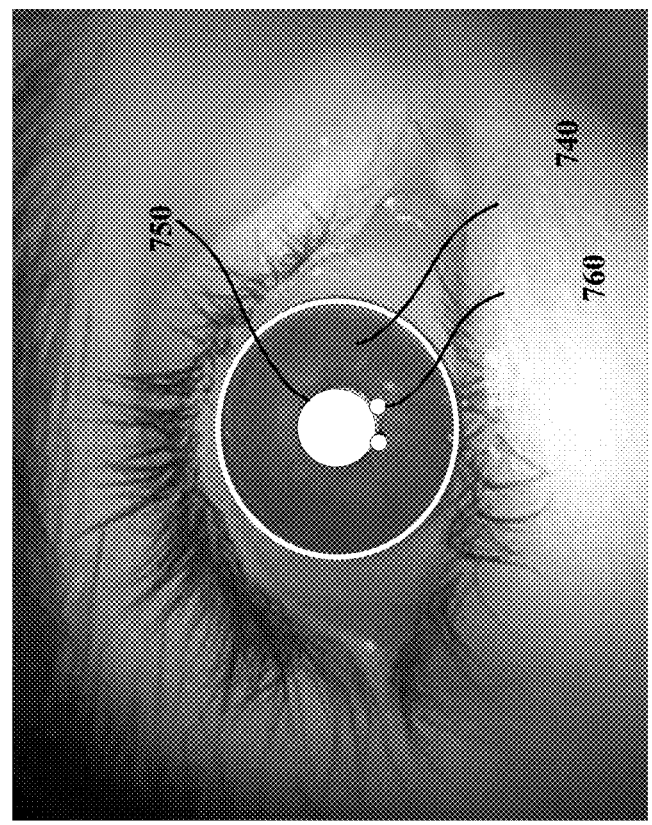
FIG. 7B illustrates an example of an identified iris region, an example of an identified pupil region, and examples of glint regions identified in an image of the user's eye according to certain embodiments.
Figure 7A:
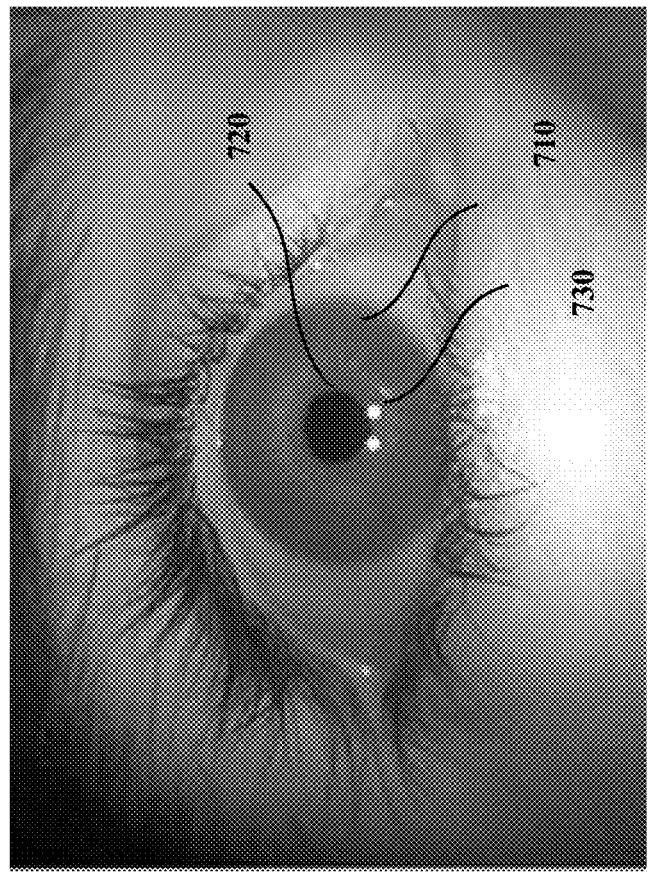
FIG. 7A illustrates an example of an image of a user's eye captured by a camera for eye-tracking according to certain embodiments.

FIG. 7A illustrates an example of an image 700 of a user's eye captured by a camera according to certain embodiments. Image 700 includes an iris region 710, a pupil region 720, and multiple glints 730. Glints 730 may be caused by illumination light specularly reflected off the cornea of the user's eye.

Optionally, at block 630, the eye-tracking system may perform system calibration to improve the precision and accuracy of eye-tracking as described above with respect to eye-tracking module 118. The system calibration may include, for example, calibrating the eye-tracking optical path (such as extrinsic (e.g., position or orientation) and intrinsic camera parameters), positions of the light sources, and the display optical path (e.g., position of the display, extrinsic and intrinsic parameters of the display optics, etc.).

At block 640, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 7A. Based on the boundaries of the pupil, the location of the center of the pupil may be determined.

At block 650, the position of the cornea of the user's eye may be determined based on the locations of the glints in the captured image of the user's eye as shown in FIG. 7A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the cornea may be determined using, for example, nonlinear optimization and based on the assumption that the cornea (in particular, the corneal apex) is close to a sphere.

FIG. 7B illustrates an example of an image 705 including an iris region 740, an example of an identified pupil region 750, and examples of glint regions 760 identified in image 700 of the user's eye according to certain embodiments. As illustrated, edges of iris region 740 and pupil region 750 are identified. The center of pupil region 720 may then be determined based on the edges of pupil region 750 and/or iris region 740. The locations of glints 730 can also be determined based on the locations of glint regions 760 identified in image 700. Based on the locations of glint regions 760, the position of the center of the cornea may be determined.

Optionally, at block 660, the eye-tracking system may perform user calibration to determine certain eye calibration parameters for improving the precision and accuracy of eye-tracking as described above with respect to eye-tracking module 118 and FIG. 5. The user calibration may include, for example, determining the eye model parameters (e.g., anatomical eye parameters) or the coefficients of some mapping functions that may not depend on a particular eye parameter. Other examples of the eye calibration parameters may include an estimated average eye radius, an average corneal radius, an average sclera radius, a map of features on the eye surface, and an estimated eye surface contour. As described above, a kappa angle between the pupillary axis (optical axis) and the foveal axis (visual axis) of the use's eye may be different for different users, and thus may need to be calibrated during the calibration. In some embodiments, the calibration may be performed by displaying a set of target points distributed over a display screen according to a certain pattern, and the user is asked to gaze at each of the target points for a certain amount of time. The camera may capture the corresponding eye positions for the target points, which are then mapped to the corresponding gaze coordinates or directions, and the eye-tracking system may then learn the mapping function or the model parameters. In some embodiments, the calibrations at block 630 and 660 may only be performed once when the near-eye display system is put on or moved.

At block 670, the gaze direction of the user's eye may be determined based on, for example, the location of the center of the pupil and the position of the center of the cornea. In some embodiments, the pupillary axis of the user's eye may be determined first and may then be used to determine the foveal axis (or line of sight, gaze direction, or visual axis) of the user's eye, for example, based on an angle between the pupillary axis and the foveal axis.

As described above, in many cases, the viewing direction may need to be determined with a high accuracy, such as less than 5°, less than 1°, or better. The peripheral location of the light sources may negatively impact the accuracy of eye-tracking due to, for example, the angles of the illuminating light from the light sources to the eye. The eye-tracking system may also need to be robust in order to accommodate for extreme changes in the viewing direction and variations in facial features surrounding user's eyes, such as cases where portions of the eye, including portions of the iris or the pupil, may be obscured by, for example, eyelids or eye lashes. Obscurations may often occur when, for example, the user looks in a downward direction or when the user rapidly re-acquires the viewing direction after the eyelids reopen during eye blinks.

In-field illumination may offer greater eye-tracking accuracy than positioning the light sources at the periphery of the user's field of view. For example, the probability of capturing glints off the cornea over all gaze angles of the eye is higher when the light sources are located within the field of view of the user. Further, positioning the light sources within the user's field of view may offer greater flexibility in the placement and distribution of the light sources, such that the amount of light captured by the camera is maximized and thus the intensity of the output light from the light sources and the power consumption of the light sources can be reduced. However, in-field illumination may have several challenges. For example, the light sources (e.g., LEDs) in the field of view of the user may affect the see-through quality of the real world images and the displayed images.

According to certain embodiments, a plurality of light sources for eye-tracking may be mounted on a transparent substrate that can be positioned in front of the eye of the user, such that the plurality of light sources is within the user's field of view. A light-directing holographic optical element (HOE) may be provided for each light source, in order to direct light from the light source to the eye of the user. The light sources and the HOEs may be immersed in a transparent substrate or encapsulated by a transparent material, for example, to reduce undesired Fresnel reflections or other artifacts and improve the image quality.

The light sources for eye illumination may be configured such that they may be invisible to the user. This may be accomplished by, for example, using light sources with very small form factors (e.g., less than 500 μm, less than 400 μm, or less than 200 μm) and emitting invisible light (e.g., IR or NIR light, such as light at 940 nm or 850 nm). The form factor may refer to a maximum linear dimension of the light source in a plane that is parallel to an emission surface of the light source. A form factor of 200 μm may be the minimum size an eye can resolve or an upper limit of what is bothersome to the user when the light source is within the user's field of view. For example, a light source with a form factor of 200 μm may not interfere with the user's vision through the glasses.

Some examples of light sources with a very small form factor are vertical-cavity surface-emitting lasers (VCSELs) that have a bare die size of less than 160 μm and an emission cone with an angle less than 25°, and micro-LEDs that have a bare die size of less than 200 μm and an emission cone with an angle less than 30°. The die size of a VCSEL or micro-LED may refer to a linear dimension of the VCSEL or the micro-LED in a plane that is parallel to an emission surface of the VCSEL or micro-LED. For example, the VCSEL or the micro-LED may have a square shape within a plane that is parallel to the emission surface, and each of the sides of the square may have a linear dimension less than 200 μm. A VCSEL or a micro-LED that has a bare die size less than 200 μm would have an emission area with a linear dimension that is significantly smaller than 200 μm because the emission area of the VCSEL or micro-LED is much smaller than the bare die size in order to accommodate other components, such as the bonding pads. For example, a diameter of the emission area may be less than 20 μm. The small emission area of the VCSEL or micro-LED would appear more like a point source than an extended source in the captured image and reduce the size of the resultant glint on the captured image. A smaller glint size in the captured image may lead to a more precise glint location determination and more accurate eye-tracking.

Figure 8:
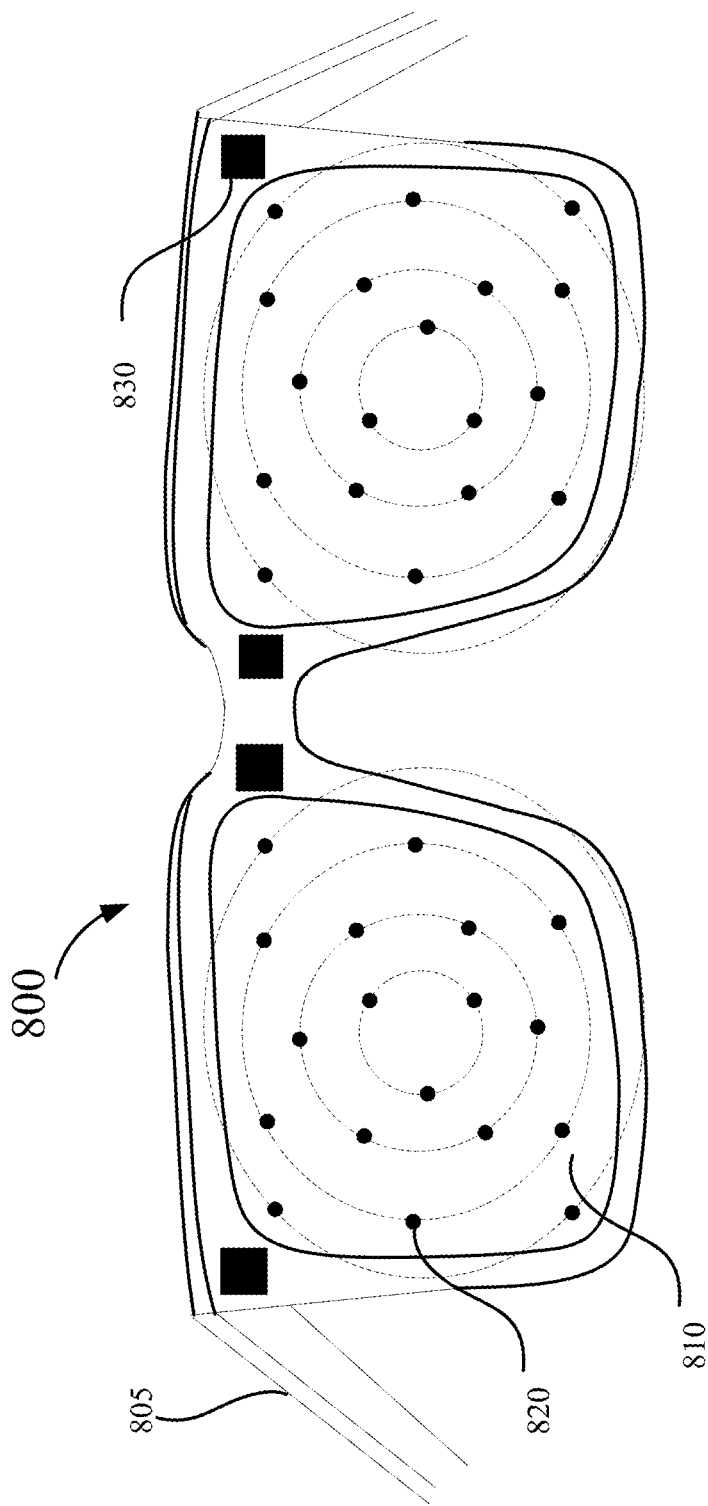
FIG. 8 illustrates an example of a near-eye display system including light sources in the field of view of the user's eye for eye-tracking according to certain embodiments.

FIG. 8 is a perspective view of an example of a near-eye display system 800 including light sources in the field of view of the user's eye for eye-tracking according to certain embodiments. FIG. 8 may be the perspective view of near-eye display system 800 viewed from the side that faces the eyes of the user. As near-eye display system 300, near-eye display system 800 may include a frame 805 and a display 810. Frame 805 may be coupled to or embedded with one or more electrical or optical components. Display 810 may include display electronics and/or display optics as described above, and may be configured to present content to a user. For example, as described above with respect to augmented reality system 400, display 810 may include a transparent substrate, such as a glass or quartz substrate, that can function as a waveguide display.

Near-eye display system 800 may include one or more light sources 820 and one or more cameras 830. As discussed in further detail below, light source(s) 820 may be mounted on a substrate, such as display 810 or another substrate, such that light source(s) 820 may be positioned within the field of view of the eye of the user. Any suitable number of light source(s) 820 may be used, and light source(s) 820 may be arranged in any suitable pattern, such as a one-dimensional array or a two-dimensional array. Light source(s) 820 may be spaced closer together or farther apart than shown in FIG. 8. The substrate may be mounted in front of display 810, or may be integrated with the display 810. The substrate may be transparent to visible light and illumination light, such as NIR light. Camera(s) 830 may be coupled to or embedded in frame 805. As described above, light source(s) 820 may emit light in a certain wavelength range (e.g., NIR) towards the eyes of the user. The emitted light may be reflected by the eyes of the user. The reflected light may then be received by camera(s) 830 to form images that may indicate certain characteristics of light source(s) 820 and the eyes of the user. Based on the images captured by camera(s) 830, an eye's position, including the orientation and location of the eye, may be determined. The gaze direction and/or gaze point of the user may also be determined based on the detected eye's position as described above. The image content displayed on display 810 may then be adjusted accordingly based on the gaze direction and/or gaze point of the user.

Figure 9:
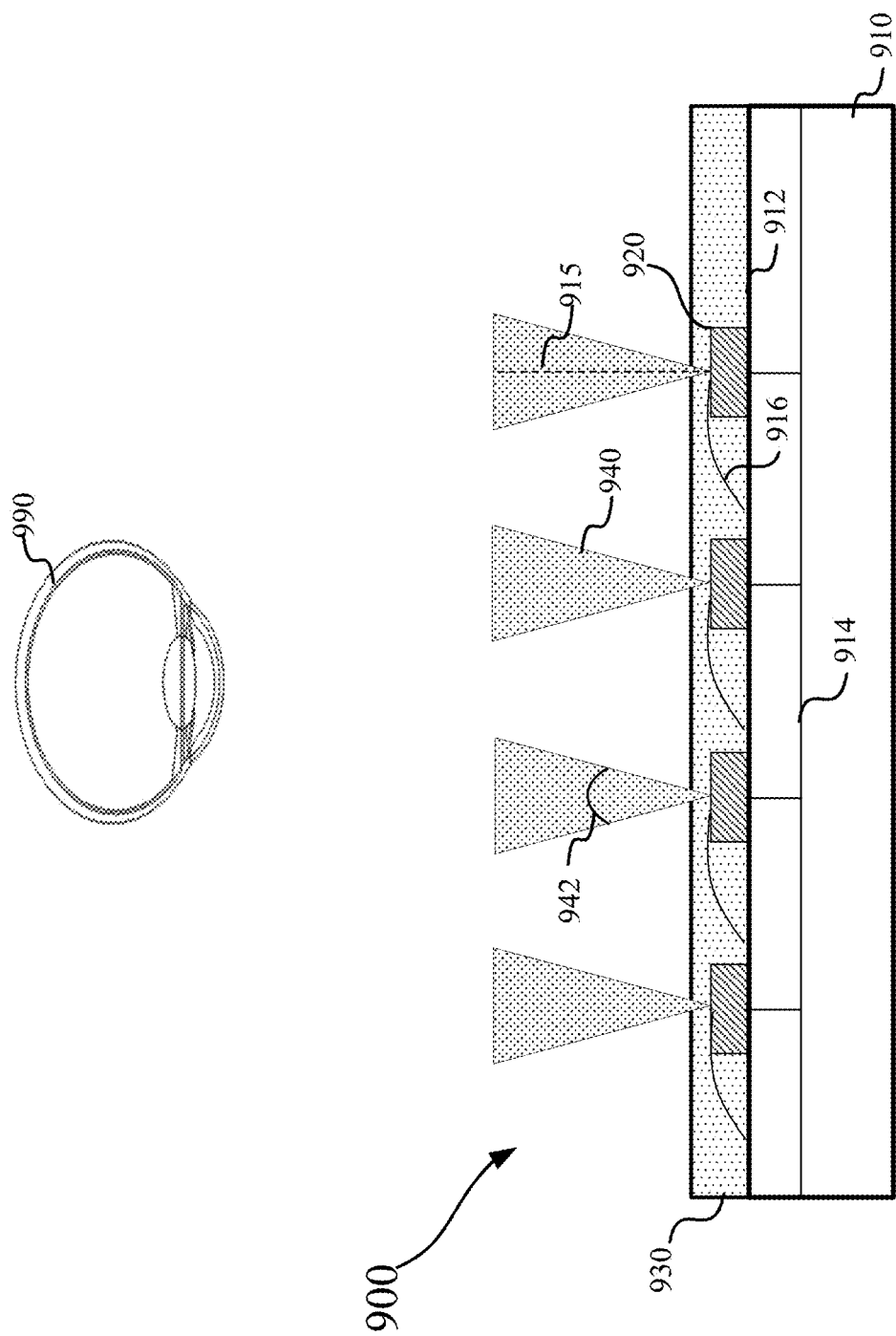
FIG. 9 is a cross-sectional view of an example of an eye illumination system including light sources in the field of view of the user's eye according to certain embodiments.

FIG. 9 is a cross-sectional view of an example of an eye illumination system 900 including light sources (e.g., micro-LEDs) in the field of view of the user's eye according to certain embodiments. FIG. 9 is for illustrative purposes only and is not drawn to scale. Eye illumination system 900 may include a substrate 910 that can be positioned in front of (e.g., at a distance about 10-20 mm from) a user's eye 990 and within the field of view of user's eye 990. Substrate 910 may include one or more types of dielectric or semiconductor materials, such as glass, quartz, plastic, polymer, PMMA, crystal, ceramic, silicon, silicon nitride, and the like, and may be transparent to, for example, both visible light and NIR light. In some implementations, substrate 910 may be a part of the waveguide display or the display optics of the near-eye display described above. Substrate 910 may have a thickness less than about 10 mm, and may have any suitable shape, such as cuboidal, or may have a curved surface. For example, a surface 912 of substrate 910 may be flat or curved. Further, some or all of substrate 910 may be coated with a conductive material that may or may not be transparent to visible light. The conductive material may include any suitable conductor, such as metal, graphene, or a transparent conductive oxide (e.g., ITO).

As shown in FIG. 9, a plurality of light sources 920 may be mounted on substrate 910. Light sources 920 may include LEDs, micro-LEDs, inorganic LEDs, OLEDs, VCSELs, or the like. Light sources 920 may be attached to substrate 910 in any suitable manner, such as bonding, gluing, or soldering. For example, light sources 920 may be die-bonded to substrate 910 using metal-loaded conductive adhesives. In some embodiments, some electrodes (e.g., anodes or cathodes) of light sources 920 may be wire-bonded to a conductive coating layer on surface 912 of substrate 910 via bonding wires 916. In some embodiments, some electrodes of light sources 920 may be electrically connected to a circuit 914 within substrate 910. Circuit 914 may be used to control light sources 920. Although a plurality of light sources 920 is shown in FIG. 9, other embodiments of eye illumination system 900 may have a single light source 920. In some embodiments, the plurality of light sources 920 may be arranged in a one-dimensional array or a two-dimensional array.

Each light source 920 may emit light having an emission cone 940, the axis of which may be normal to a top surface of light source 920. For example, each light source 920 may be a VCSEL or a micro-LED having an emission cone 940 with an angle 942 less than about 30° or 40°. Light sources 920 may be surrounded by or immersed in an encapsulation layer 930 that is a refractive index matched layer, such that a refractive index of encapsulation layer 930 may match a refractive index of substrate 910 and/or light sources 920. Encapsulation layer 930 may protect light sources 920 from damage and reduce Fresnel reflections at interfaces between different materials.

As shown in FIG. 9, a chief ray 915 in each emission cone 940 may be normal to the top surface of light sources 920 and substrate 910. As a result, some light from some light sources 920 (e.g., light sources 920 at the edges of substrate 910) may not reach user's eye 990. This may cause some or all of the light from some light sources 920 to be wasted. This may be particularly problematic for light sources 920 that are positioned in the outer regions of substrate 910, due to the narrow emission cones 940 of light sources 920. Some embodiments may address this issue by making surface 912 of substrate 910 curved or tilting light sources 920. However, it may be difficult to bond light sources 920 on a curved surface or tilt individual light sources 920 differently on a flat surface. In some embodiments, micro-optical components, such as micro-prisms, may be fabricated on a substrate and used to direct light emitted from light sources 920 towards user's eye 990. However, the top of the substrate may not be smooth, or the refractive index of an encapsulation layer and the refractive index of the materials for the micro-optical components may need to have a large difference, which may cause unwanted reflections and/or may affect the quality of the see-through images.

Figure 10:
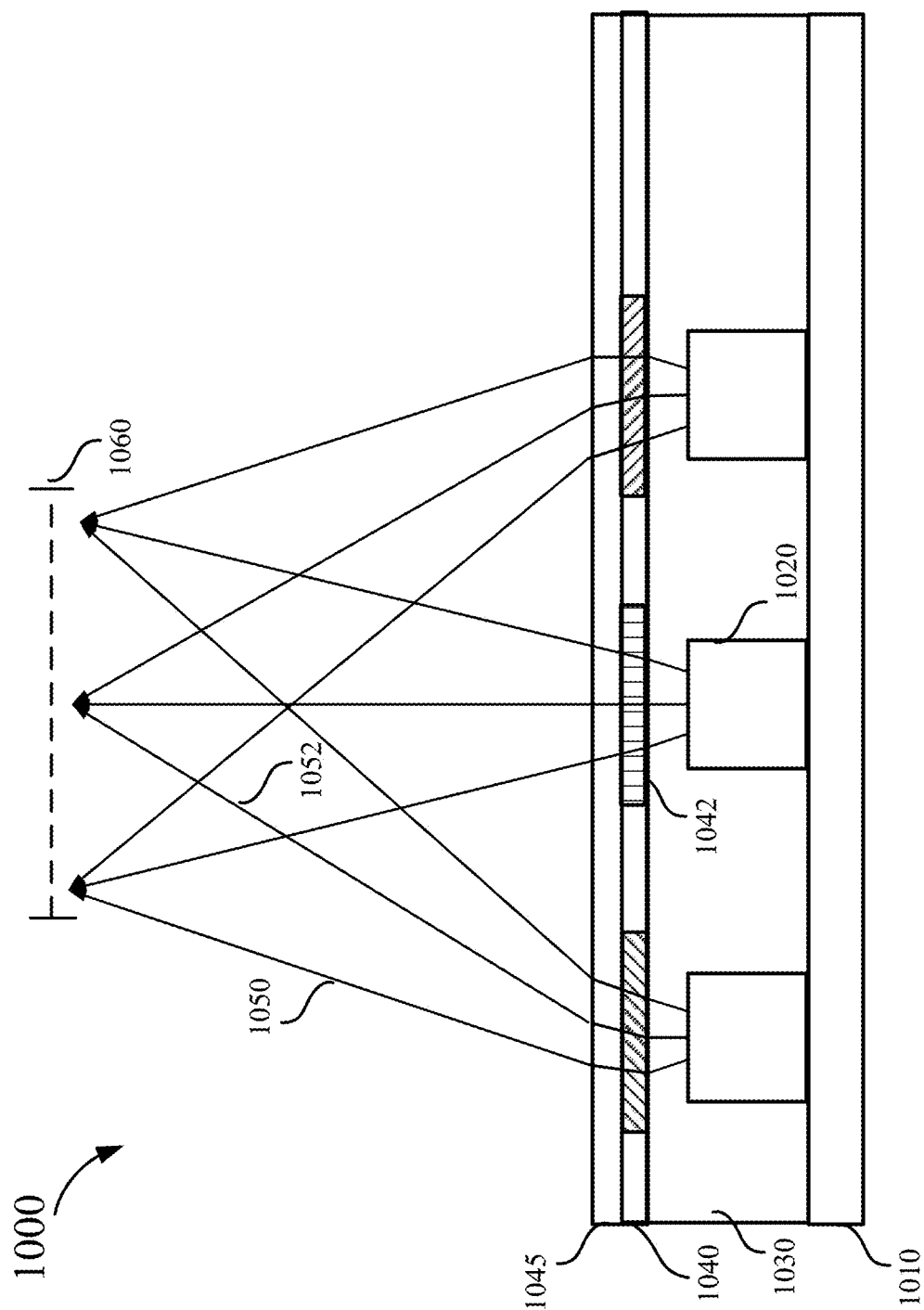
FIG. 10 is a cross-sectional view of an example of an eye illumination system including light sources in the field of view of the user's eye and holographic optical elements for directing light from the light sources to the user's eye according to certain embodiments.

FIG. 10 is a cross-sectional view of an example of an eye illumination system 1000 including light sources in the field of view of the user's eye and holographic optical elements (HOEs) for directing light from the light sources to the user's eye according to certain embodiments. The HOEs may include, for example, holographic gratings (e.g., volume Bragg gratings), holographic lenses, holographic diffusers, and the like. FIG. 10 is merely illustrative and is not drawn to scale.

Eye illumination system 1000 may include a substrate 1010 that that may be similar to substrate 910, and may include one or more types of dielectric or semiconductor materials. An array of light sources 1020 may be bonded to substrate 1010. Light sources 1020 may be similar to light sources 920 and may include, for example, LEDs, micro-LEDs, inorganic LEDs, OLEDs, VCSELs, or the like. In some embodiments, light sources 1020 may be encapsulated by an encapsulation layer 1030. A holographic layer 1040 including an array of HOEs 1042 may be formed on top of light sources 1020 and/or encapsulation layer 1030. In some embodiments, holographic layer 1040 may be formed on encapsulation layer 1030 by laminating pre-recorded HOEs on encapsulation layer 1030. In some embodiments, holographic layer 1040 may be formed on encapsulation layer 1030 by depositing a layer of holographic recording material and recording the array of HOEs 1042 using one or more masks. An encapsulation layer 1045 (or cover layer) may be formed on holographic layer 1040 before or after the holographic recording.

As shown in FIG. 10, each light source 1020 may be provided with a respective HOE that directs light from light source 1020 to an illumination field 1060, such as a user's eye. The array of HOEs 1042 may be configured to bend chief rays 1052 of light beams 1050 emitted from light sources 1020 at different angles. For example, HOEs 1042 for light sources 1020 near the outer edges of substrate 1010 may be configured to bend the chief rays 1052 at larger angles in order to direct the light to illumination field 1060. Because each light source 1020 may have a narrow emission cone, HOEs 1042 may prevent some or all of the light emitted by light sources 1020 from falling outside of illumination field 1060. Further, using multiple light sources 1020 to illuminate illumination field 1060 may help to illuminate each area of illumination field 1060 approximately uniformly, and also may allow multiple glints to be generated to improve the eye-tracking accuracy.

HOEs 1042 shown in FIG. 10 may include any combination of various holographic optical elements, such as holographic gratings, holographic lenses, holographic diffusers, and the like. For example, HOEs 1042 may include holographic gratings with different diffraction angles for surface normal incident light. One example of the holographic grating may be holographic volume Bragg grating, which may be recorded on a holographic material layer by exposing to light patterns generated by the interference between two or more coherent light beams.

Figures 11A, 11B:
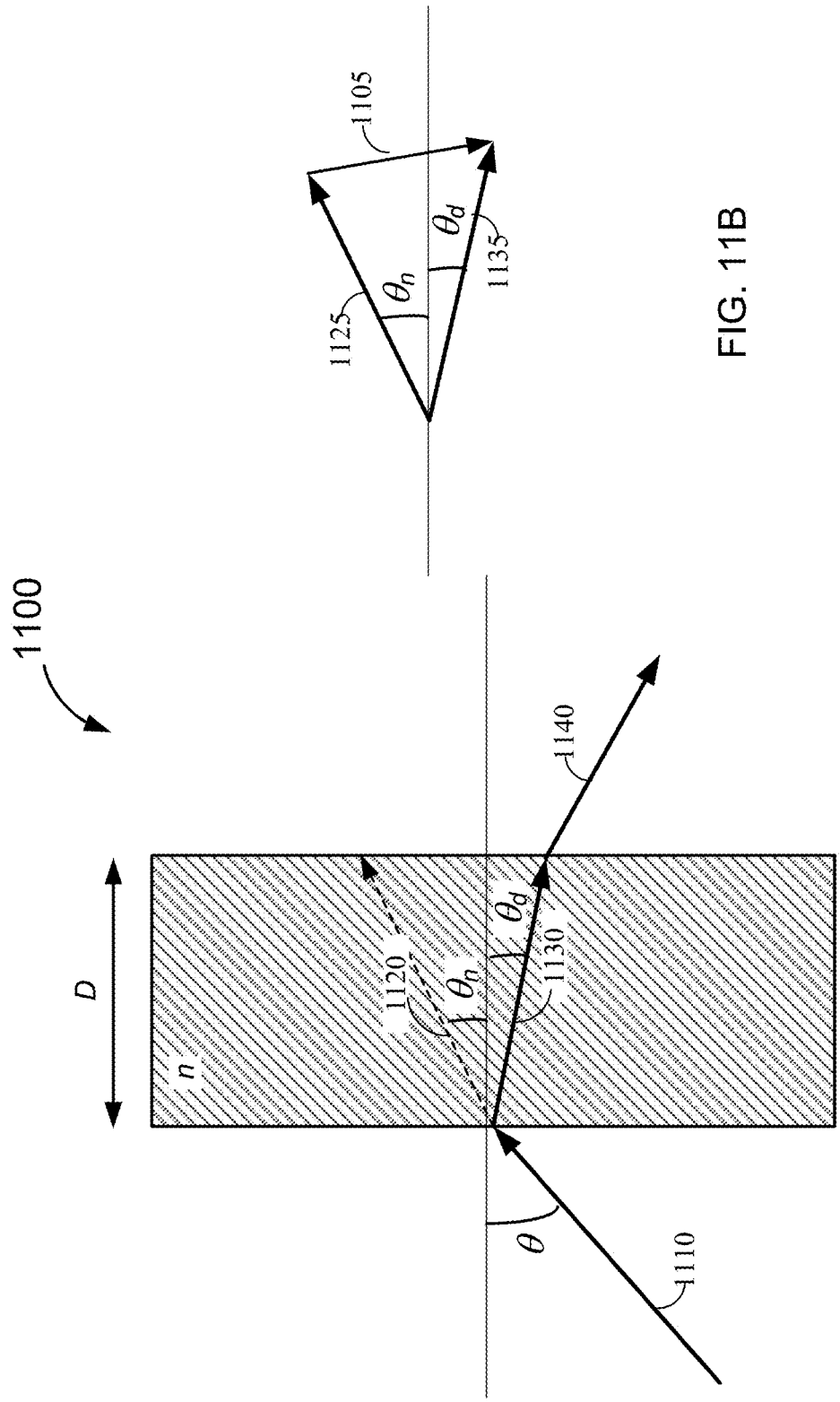
FIG. 11A illustrates an example of a volume Bragg grating.
FIG. 11B illustrates the Bragg condition for the volume Bragg grating shown in FIG. 11A.

FIG. 11A illustrates an example of a volume Bragg grating (VBG) 1100. Volume Bragg grating 1100 shown in FIG. 11A may include a transmission holographic grating that has a thickness D. The refractive index n of volume Bragg grating 1100 may be modulated at an amplitude $n_1$, and the grating period of volume Bragg grating 1100 may be $\Lambda$. Incident light 1110 having a wavelength $\lambda$ may be incident on volume Bragg grating 1100 at an incident angle $\theta$, and may be refracted into volume Bragg grating 1100 as incident light 1120 that propagates at an angle $\theta_n$ in volume Bragg grating 1100. Incident light 1120 may be diffracted by volume Bragg grating 1100 into diffraction light 1130, which may propagate at a diffraction angle $\theta_d$ in volume Bragg grating 1100 and may be refracted out of volume Bragg grating 1100 as diffraction light 1140.

FIG. 11B illustrates the Bragg condition for volume Bragg grating 1100 shown in FIG. 11A. Vector 1105 represents the grating vector $\vec{G}$, where $|\vec{G}|=2\pi/\Lambda$. Vector 1125 represents the incident wave vector $\vec{k_i}$, and vector 1135 represents the diffract wave vector $\vec{k_d}$, where $|\vec{k_i}|=|\vec{k_d}|=2\pi n/\lambda$. Under the Bragg phase-matching condition, $\vec{k_i}-$ $\vec{k_d} = \vec{G}$. Thus, for a given wavelength $\lambda$, there may only be one pair of incident angle $\theta$ (or $\theta_n$) and diffraction angle $\theta_d$ that meets the Bragg condition perfectly. Similarly, for a given incident angle $\theta$, there may only be one wavelength $\lambda$ that meets the Bragg condition perfectly. As such, the diffraction may only occur in a small wavelength range and a small incident angle range. The diffraction efficiency, the wavelength selectivity, and the angular selectivity of volume Bragg grating 1100 may be functions of thickness D of volume Bragg grating 1100. For example, the full-width-half-magnitude (FWHM) wavelength range and the FWHM angle range of volume Bragg grating 1100 at the Bragg condition may be inversely proportional to thickness D of volume Bragg grating 1100, while the maximum diffraction efficiency at the Bragg condition may be a function $\sin^2(a \times n_1 \times D)$, where a is a coefficient. For a reflection volume Bragg grating, the maximum diffraction efficiency at the Bragg condition may be a function of $\tan h^2(a \times n_1 \times D)$.

In some designs, a multiplexed Bragg grating may be used to achieve a desired optical performance, such as a high diffraction efficiency and large FOV for the full visible spectrum (e.g., from about 400 nm to about 700 nm, or from about 440 nm to about 650 nm). Each part of the multiplexed Bragg grating may be used to diffract light from a different FOV range and/or within a different wavelength range. Thus, in some designs, multiple volume Bragg gratings each recorded under a different recording condition may be used.

Eye-tracking light (e.g., IR light or NIR light at 940 nm or 850 nm) emitted by the light sources (e.g., micro-LEDs or VCSELs) may meet the Bragg condition of holographic Bragg grating, and thus may be directed to the user's eye by the Bragg grating. The Bragg grating may transmit (e.g., refract) visible light because the visible light may not meet the Bragg condition. Therefore, the Bragg grating may be formed (e.g., recorded in a coated or laminated layer) on a transparent substrate of a near-eye display for eye illumination and imaging. Because visible light is allowed to pass through the holographic optical elements and the substrate with little or no loss, the holographic optical elements can be positioned in front of the user's eyes without obstructing the user's field of view, such that the user can look through the substrate and the holographic optical elements to see the outside world or the displayed content. At the same time, light (e.g., NIR light) from a light source for eye illumination can be directed by the one or more holographic optical elements to desired directions and reach the user's eye to form glints.

The holographic optical elements described above may be recorded in a holographic material (e.g., photopolymer) layer. In some embodiments, the HOEs can be recorded first and then laminated on a substrate (e.g., display 810 or another substrate) in a near-eye display system. In some embodiments, a holographic material layer may be coated or laminated on the substrate and the HOEs may then be recorded in the holographic material layer. Thus, in various embodiments, a holographic optical element may include a holographic material layer, a holographic material layer and a support layer (e.g., a substrate or a thin film), or a holographic material layer and two support layers (one on each of two sides of the holographic material layer).

In general, to record a holographic optical element in a photosensitive material layer, two coherent beams may interfere with each other at certain angles to generate a unique interference pattern in the photosensitive material layer, which may in turn generate a unique refractive index modulation pattern in the photosensitive material layer, where the refractive index modulation pattern may correspond to the light intensity pattern of the interference pattern. The photosensitive material layer may include, for example, silver halide emulsion, dichromated gelatin, photopolymers including photo-polymerizable monomers suspended in a polymer matrix, photorefractive crystals, and the like. Some parameters of the photosensitive material layer that may affect the selection of the photosensitive material layer may include, for example, the spatial frequency response, dynamic range, photosensitivity, physical dimensions, mechanical properties, wavelength sensitivity, and development or bleaching method for the photosensitive material layer.

In one example, the photosensitive material layer may include polymeric binders, writing monomers (e.g., acrylic monomers), and initiating agents, such as photosensitizing dyes, initiators, and/or chain transfer agents. The polymeric binders may act as the backbone or the support matrix. For example, the polymeric binders may include a low refractive index rubbery polymer (e.g., a polyurethane) which may be thermally cured to provide mechanical support during the holographic exposure and ensure the refractive index modulation is permanently preserved. The writing monomers may serve as refractive index modulators. For example, the writing monomers may include high index acrylate monomers which may react with photoinitiators and polymerize. The photosensitizing dyes may absorb light and interact with the initiators to produce radicals or acids. The radicals or acids may initiate the polymerization by adding monomers to the ends of chains of monomers to polymerize the monomers.

During the recording process, the interference pattern may cause the generation of the radicals or acids in the bright fringes, which may in turn cause the diffusion of the monomers to bright fringes and the polymerization of the monomers in the bright fringes, thus generating polymerization concentration and density gradients that may result in refractive index modulation. Areas with a higher concentration of monomers and polymerization may have a higher refractive index. As the exposure and polymerization proceed, fewer monomers may be available for diffusion and polymerization, and thus the diffusion and polymerization may be suppressed. After all or substantially all monomers have been polymerized, no more new holographic optical elements (e.g., gratings) may be recorded in the photosensitive material layer.

In some embodiments, the recorded holographic optical elements in the photosensitive material layer may be UV cured or thermally cured or enhanced, for example, for dye bleaching, completing polymerization, permanently fixing the recorded pattern, and enhancing the refractive index modulation. At the end of the process, a holographic optical element, such as a holographic grating, may be formed. The holographic grating can be a volume Bragg grating with a thickness of, for example, a few, or tens, or hundreds of microns.

To generate the desired light interference pattern for recording the HOEs, two or more coherent beams may generally be used, where one beam may be a reference beam and another beam may be an object beam that may have a desired wavefront profile. When the recorded HOEs are illuminated by the reference beam, the object beam with the desired wavefront profile may be reconstructed.

FIG. 12A illustrates an example of a volume Bragg grating 1200 for directing IR light from a light source to the user's eye according to certain embodiments. FIG. 12B illustrates the Bragg condition for volume Bragg grating 1200 shown in FIG. 12A. As illustrated, the IR light emitted by the light source (e.g., a VCSEL) for eye illumination may have a wavelength around 940 nm. The IR light may be incident on volume Bragg grating 1200 at small incident angles, where the chief ray may be incident on volume Bragg grating 1200 at an angle near 0° as shown by a light ray 1210. Vector 1235 may represent the wave vector of the incident light (e.g., light ray 1210) in volume Bragg grating 1200. The incident light may be diffracted by volume Bragg grating 1200 at diffraction angles, where the chief ray may be diffracted at an angle about 50° as shown by a light ray 1220. Vector 1225 may represent the wave vector of the diffracted light in volume Bragg grating 1200, which forms an angle $\theta_d$ with respect to the surface normal of volume Bragg grating 1200. To meet the Bragg condition, the desired grating vector of the volume Bragg grating may be represented by vector 1205 in FIG. 12B, such that the sum of vector 1235 and vector 1205 equals to vector 1225.

There may be very few holographic recording materials that are sensitive to infrared light. As such, to record a holographic grating that can diffract infrared light, recording light at a shorter wavelength may be used, and the recording condition (e.g., the angles of the two interfering coherent beams) may be different from the reconstruction condition.

Figure 13:
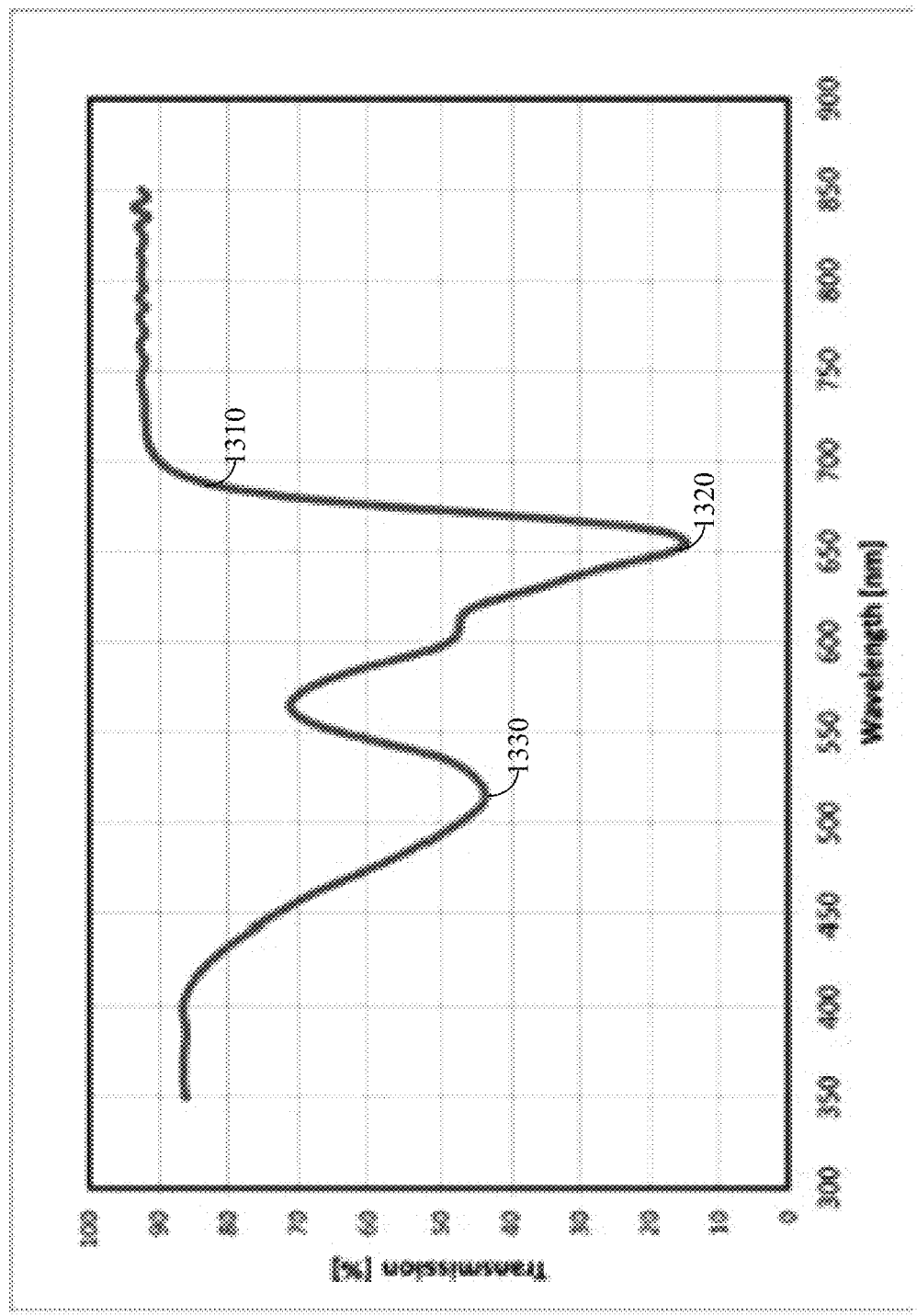
FIG. 13 illustrates the absorption spectrum of an example of a holographic recording material according to certain embodiments.

FIG. 13 illustrates the absorption spectrum 1310 of an example of a holographic recording material according to certain embodiments. As shown in the example, the holographic recording material may have a very low absorption rate for light with a wavelength longer than 700 nm or shorter than 440 nm. The holographic recording material may have a peak light absorption at 660 nm as shown by the minimum transmission point 1320. The holographic recording material may also have a local minimum transmission point 1330 (i.e., local maximum absorption point) at about 514 nm. As such, holographic gratings may be recorded in the holographic recording material using coherent light beams with a wavelength between about 440 nm and about 670 nm, such as at about 660 nm, about 532 nm, about 514 nm, or about 457 nm.

Figure 14B:
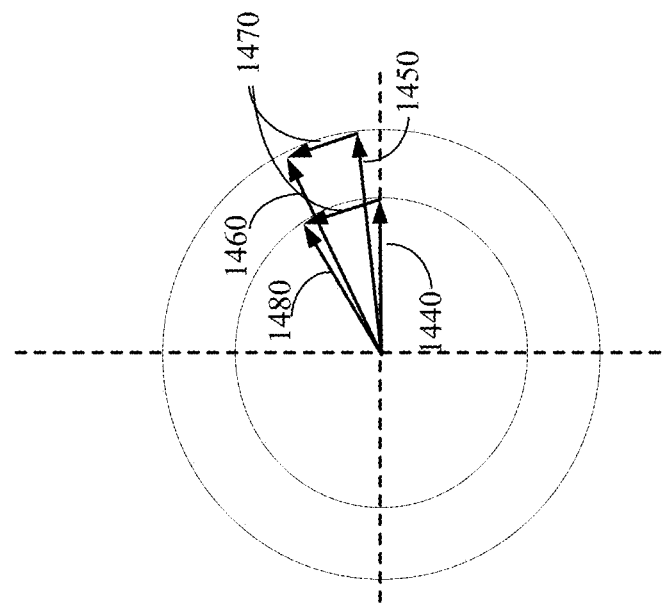
FIG. 14B is an example of a holography momentum diagram illustrating the wave vectors of recording beams and reconstruction beams and the grating vector of the recorded volume Bragg grating according to certain embodiments.
Figure 14A:
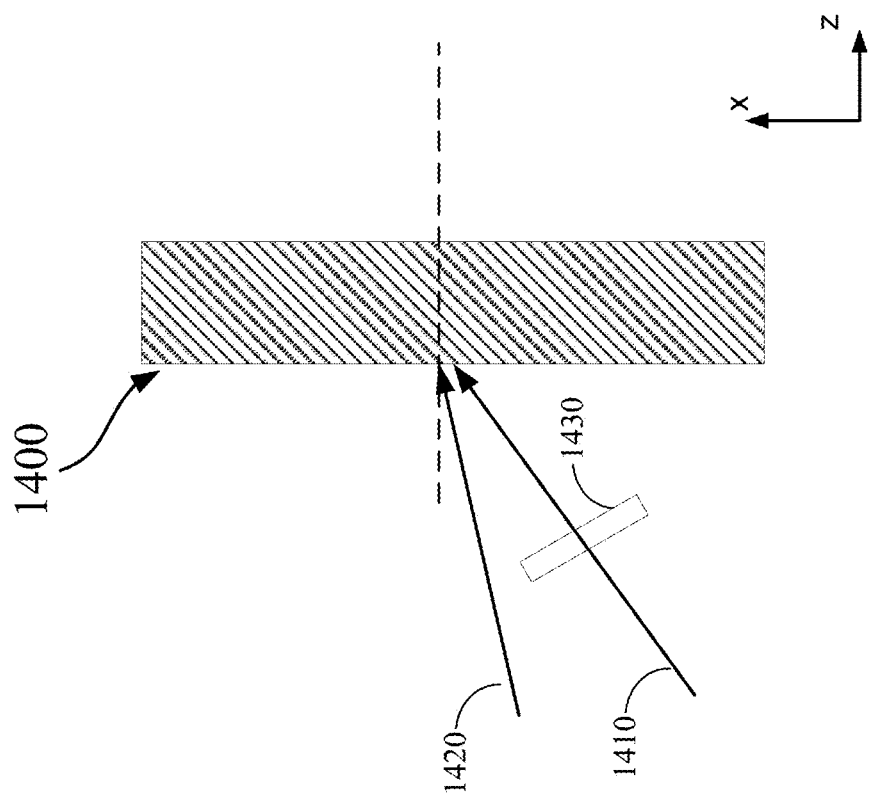
FIG. 14A illustrates the recording light beams for recording a volume Bragg grating for directing light from a light source to the user's eye according to certain embodiments.

FIG. 14A illustrates the recording light beams for recording a volume Bragg grating 1400 for directing light from a light source to the user's eye according to certain embodiments. In the example illustrated, volume Bragg grating 1400 may include a transmission volume hologram recorded using reference beam 1420 and object beam 1410 at a first wavelength, such as 660 nm. In some embodiments, object beam 1410 may be diffused by a master diffuser 1430 to generate an expanded or diffused object beam. As shown in FIG. 12A, when a light beam at a second wavelength (e.g., 940 nm) is incident on volume Bragg grating 1400 at a 0° incident angle, the incident light beam may be diffracted by volume Bragg grating 1400 at the desired diffraction angle.

FIG. 14B is an example of a holography momentum diagram illustrating the wave vectors of recording beams and reconstruction beams and the grating vector of the recorded volume Bragg grating according to certain embodiments. FIG. 14B shows the Bragg matching conditions during the holographic grating recording and reconstruction. The length of wave vectors 1450 and 1460 of the recording beams (e.g., reference beam 1420 and object beam 1410) may be determined based on the recording light wavelength $\lambda_c$ (e.g., 660 nm) according to $2\pi n/\lambda_c$, where n is the average refractive index of holographic material layer. The directions of wave vectors 1450 and 1460 of the recording beams may be determined based on the desired grating vector K (1470) such that wave vectors 1450 and 1460 and grating vector K (1470) can form an isosceles triangle as shown in FIG. 14B. Grating vector K may have an amplitude $2\pi/\Lambda$, where $\Lambda$ is the grating period. Grating vector K may in turn be determined based on the desired reconstruction condition. For example, based on the desired reconstruction wavelength $\lambda_r$ (e.g., 940 nm) and the directions of the incident light beam and the diffracted light beam, grating vector K (1470) of volume Bragg grating 1400 may be determined based on the Bragg condition, where wave vector 1440 of the incident light beam (e.g., light ray 1210) and wave vector 1480 of the diffracted light beam (e.g., light ray 1220) may have an amplitude $2\pi n/\lambda_r$, and may form an isosceles triangle with grating vector K (1470) as shown in FIG. 14B.

For a given wavelength, there may only be one pair of an incident angle and a diffraction angle that meets the Bragg condition perfectly. Similarly, for a given incident angle, there may only be one wavelength that meets the Bragg condition perfectly. When the incident angle of the reconstruction light beam is different from the incident angle that meets the Bragg condition of the volume Bragg grating or when the wavelength of the reconstruction light beam is different from the wavelength that meets the Bragg condition of the volume Bragg grating, the diffraction efficiency may be reduced as a function of the Bragg mismatch factor caused by the angular or wavelength detuning from the Bragg condition. As such, the diffraction may only occur in a small wavelength range and a small incident angle range.

Figure 15:
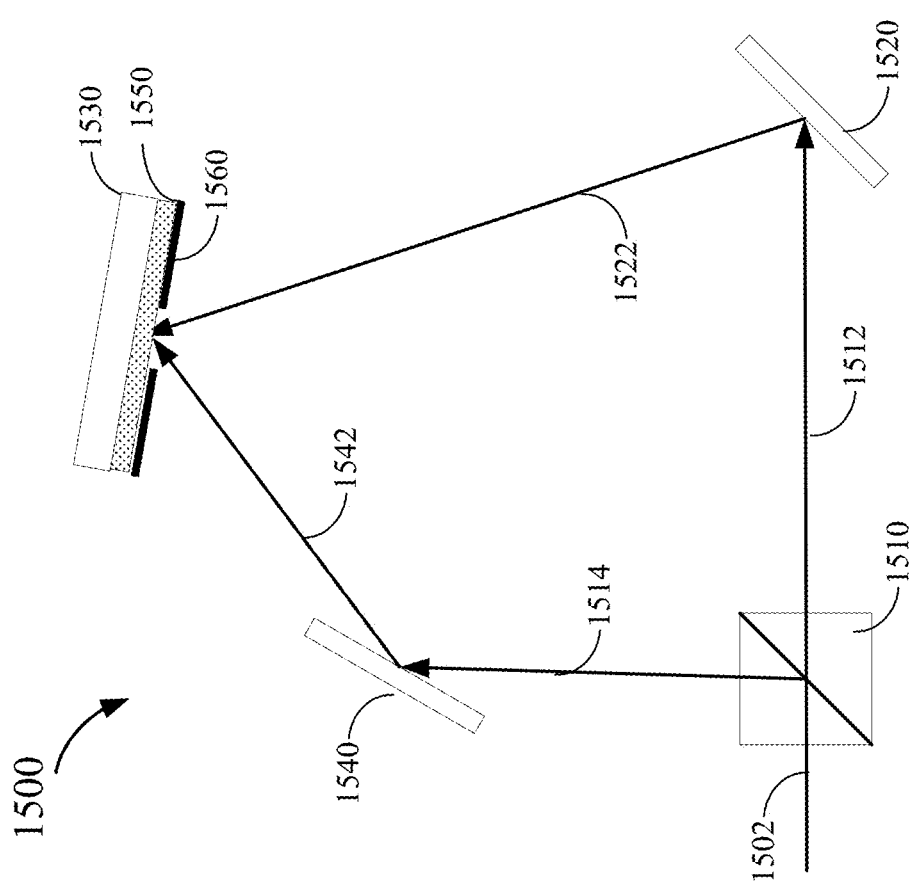
FIG. 15 illustrates an example of a holographic recording system for recording holographic optical elements according to certain embodiments.

FIG. 15 illustrates an example of a holographic recording system 1500 for recording holographic optical elements according to certain embodiments. Holographic recording system 1500 includes a beam splitter 1510 (e.g., a beam splitter cube), which may split an incident laser beam 1502 into two light beams 1512 and 1514 that are coherent and may have similar intensities. Light beam 1512 may be reflected by a first mirror 1520 towards a plate 1530 as shown by the reflected light beam 1522. On another path, light beam 1514 may be reflected by a second mirror 1540. The reflected light beam 1542 may be directed towards plate 1530, and may interfere with light beam 1522 at plate 1530 to generate an interference pattern. A holographic recording material layer 1550 may be formed on plate 1530 or on a substrate mounted on plate 1530. The interference pattern may cause the holographic optical element to be recorded in holographic recording material layer 1550 as described above. In some embodiments, plate 1530 may also be a mirror.

In some embodiments, a mask 1560 may be used to record different HOEs at different regions of holographic recording material layer 1550. For example, mask 1560 may include an aperture 1562 for the holographic recording and may be moved to place aperture 1562 at different regions on holographic recording material layer 1550 to record different HOES at the different regions using different recording conditions (e.g., recording beams with different angles).

In some embodiments, a diffuser may be used in one of the two light paths in holographic recording system 1500 for diffusing a recording beam, such that the recorded HOEs can expand the narrow light beam emitted from the light source.

Figure 16:
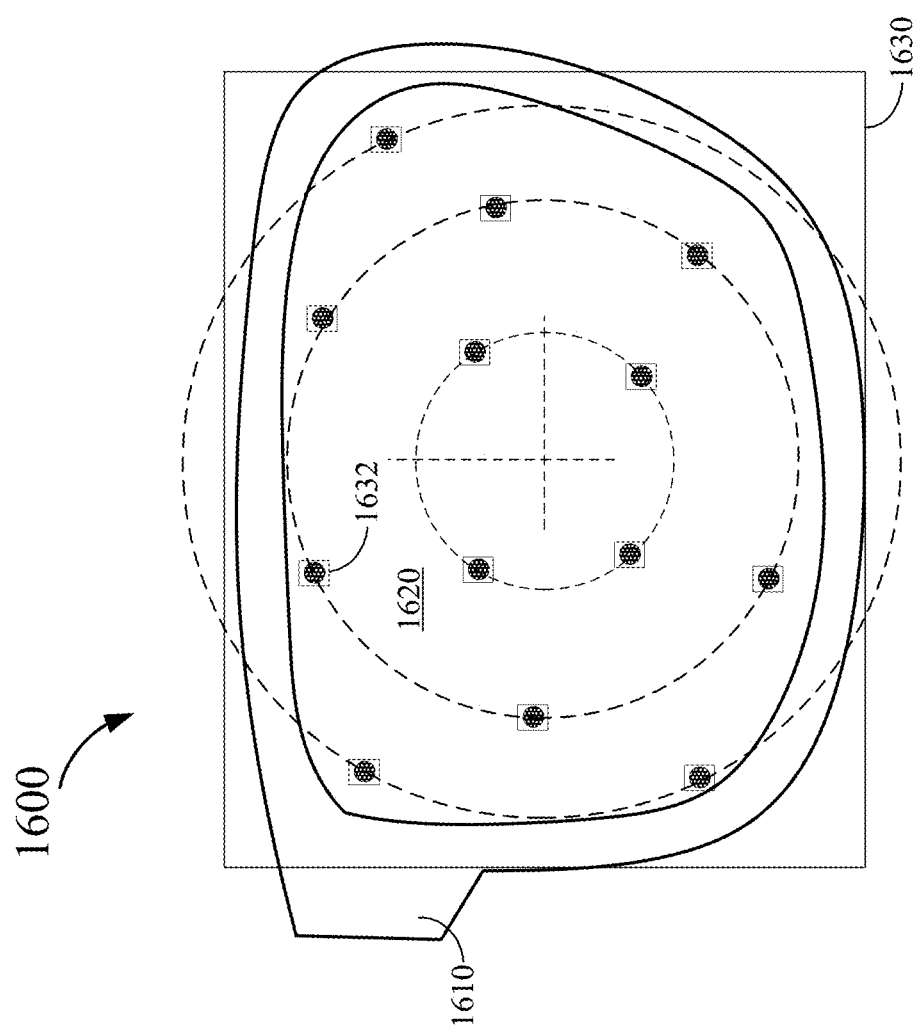
FIG. 16 illustrates a portion of an example of a near-eye display including light sources in the field of view of the user's eye and holographic optical elements for directing light from the light sources to the user's eye according to certain embodiments.

FIG. 16 illustrates a portion of an example of a near-eye display 1600 including light sources in the field of view of the user's eye and HOEs (e.g., volume Bragg gratings) for directing light from the light sources to the user's eye according to certain embodiments. As near-eye display system 800, near-eye display 1600 may include a frame 1610 and a display 1620. Display 1620 may include display electronics and/or display optics as described above, and may be configured to present content to a user. For example, display 1620 may include a transparent substrate, such as a glass or quartz substrate. An array of invisible light sources with a small form factor, such as VCSELs or micro-LEDs emitting infrared or NIR light, may be embedded in display 1620 or another substrate in near-eye display 1600. A layer 1630 including an array of HOEs 1632 may be formed (e.g., recorded and laminated or laminated and recorded) on display 1620 or another substrate where the invisible light sources may be embedded. The array of HOEs 1632 may be aligned with the array of invisible light sources, where each HOE 1632 may be configured to direct the invisible light emitted by each respective light source at a respective angle to the eye of the user of near-eye display 1600. Layer 1630 may have 2D dimensions similar to the 2D dimensions of display 1620, and may be conformally formed on display 1620 or another substrate, which may have a curved or flat surface. In the example shown in FIG. 16, the array of invisible light sources may include 13 invisible light sources, and layer 1630 may include 13 HOEs each recorded during a respective exposure where the angles of the recording beams may be set differently for different exposures.

Figure 17B:
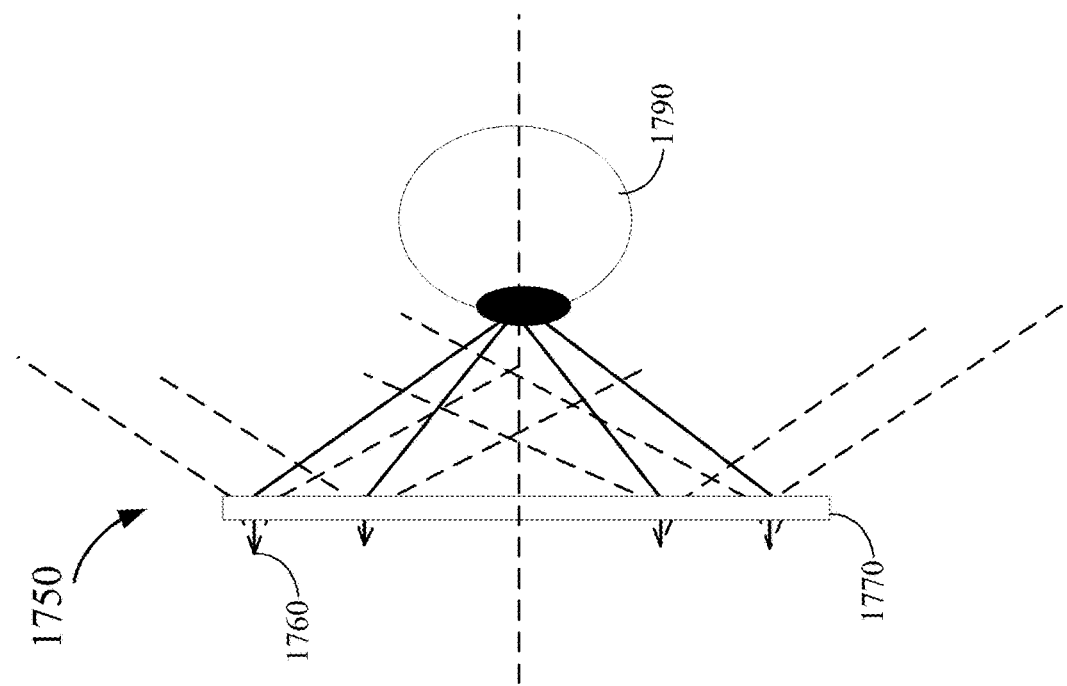
FIG. 17B is a cross-sectional view of an example of a near-eye display including light sources in the field of view of the user's eye and holographic diffusers for diffusing light from the light sources to the user's eye according to certain embodiments.
Figure 17A:
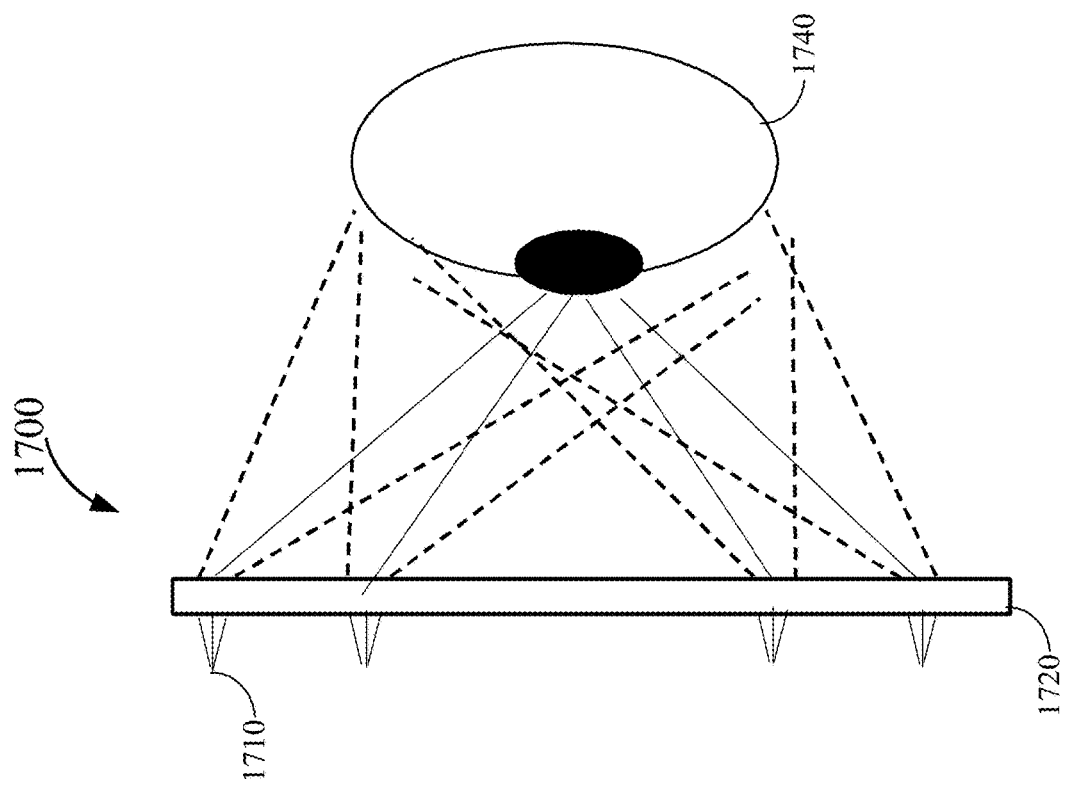
FIG. 17A is a cross-sectional view of an example of a near-eye display including light sources in the field of view of the user's eye and holographic optical elements for directing light from the light sources to the user's eye according to certain embodiments.

FIG. 17A is a cross-sectional view of an example of a near-eye display 1700 including light sources in the field of view of the user's eye and HOEs for directing light from the light sources to the user's eye according to certain embodiments. Near-eye display 1700 may include an array of light sources 1710 and a layer 1720 including one or more HOEs. The light emitted by light sources 1710 at the edges of the array of light sources 1710 may be bent at large angles towards a user's eye 1740. The one or more HOEs may include, for example, a holographic grating, holographic lens, holographic diffuser, or any combination thereof.

In some embodiments, the one or more HOEs in layer 1720 can be recorded in a single exposure as a single HOE. As shown in FIG. 17A, a chief ray 1730 of a light source is bent toward the center of the user's eye 1740 after it passes through the HOE. Thus, the one or more HOEs in layer 1720 may function as a holographic lens or a microlens array. Thus, an on-axis hologram recording setup can be used to record the holographic lens in layer 1720, where a lens or a microlens array may be in one of the two recording light paths such that one of the recording beam (e.g., the object beam) may have the wavefront profile of a lens or a microlens array. In some embodiments, the emission cone may be diverged and/or bent by the holographic lens in layer 1720, where a diffuser may be used in the light path for the object beam. After the exposure using the recording beams that include the object beam modified by the lens (or microlens array) and/or the diffuser, an HOE with a center aligned with the center of user's eye 1740 may be formed to achieve desired light distribution on user's eye 1740.

FIG. 17B is a cross-sectional view of an example of a near-eye display 1750 including light sources in the field of view of the user's eye and holographic diffusers for diffusing light from the light sources to a user's eye 1790 according to certain embodiments. Near-eye display 1750 may include an array of light sources 1760 and a layer 1770 including one or more HOEs. The light emitted by light sources 1760 at the edges of the array of light sources 1760 may be expanded by layer 1770 towards user's eye 1790. In some embodiments, a lens or a microlens array may be used in the light path for a recording beam to bend the chief rays from the array of light sources 1760 as shown in FIG. 17B.

As described above, the light sources and the HOEs for eye illumination may be encapsulated in refractive-index matching materials to reduce the undesired Fresnel reflections at interfaces between different materials. Compared with refractive optical elements (e.g., refractive lenses, prisms, wedges, etc.) for bending or diverging the light emitted by the invisible light source, holographic optical elements can be flat, can be laminated or deposited conformally on a curved or flat surface, and can be encapsulated by materials having a similar refractive index as the holographic material. Thus, stray light caused by undesired reflections and other optical artifacts may be reduced to improve the quality of the captured images of the user's eyes including glints, and thus can improve the accuracy of the eye-tracking.

Figure 18B:
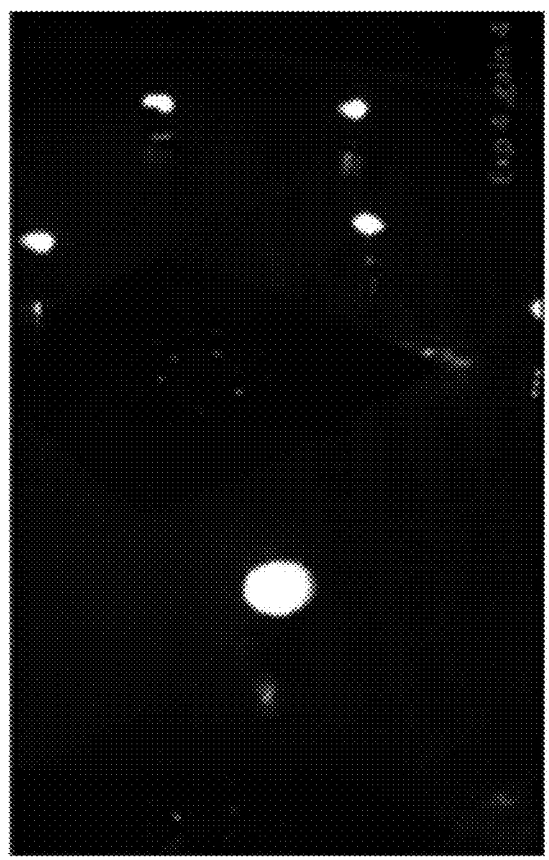
FIG. 18B is an example of an image illustrating an eye illumination pattern of an eye-tracking system with encapsulated light sources and light-directing optics according to certain embodiments.
Figure 18A:
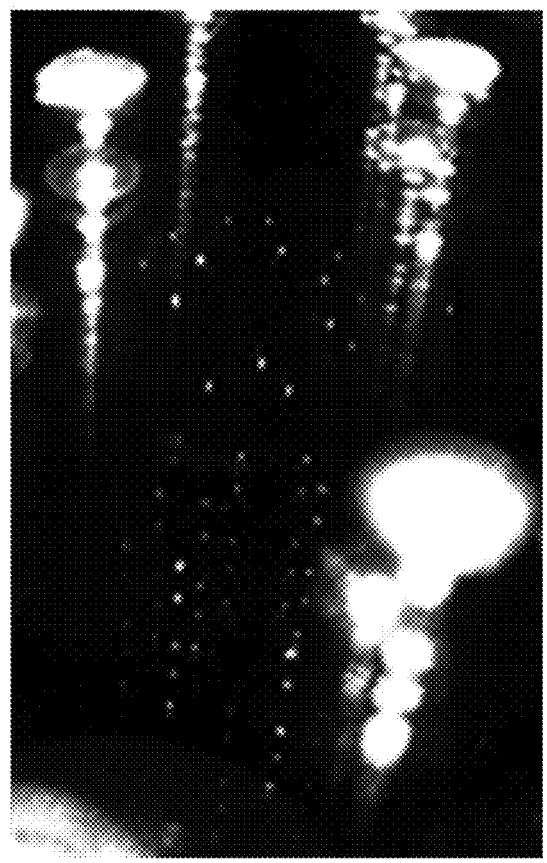
FIG. 18A is an example of an image illustrating an eye illumination pattern of an eye-tracking system without encapsulating the light sources (and the light-directing optics) according to certain embodiments.

FIG. 18A is an example of an image 1800 illustrating an eye illumination pattern of an eye-tracking system without encapsulating the light sources and/or the light-directing optics (e.g., HOEs) in a refractive index matching material according to certain embodiments. FIG. 18B is an example of an image 1805 illustrating an eye illumination pattern of an eye-tracking system with the light sources and the light-directing optics encapsulated in a refractive index matching material according to certain embodiments. As shown by the examples, ghost images can be significantly reduced by encapsulating the light sources and the light-directing optics in the refractive index matching materials.

Figure 19:
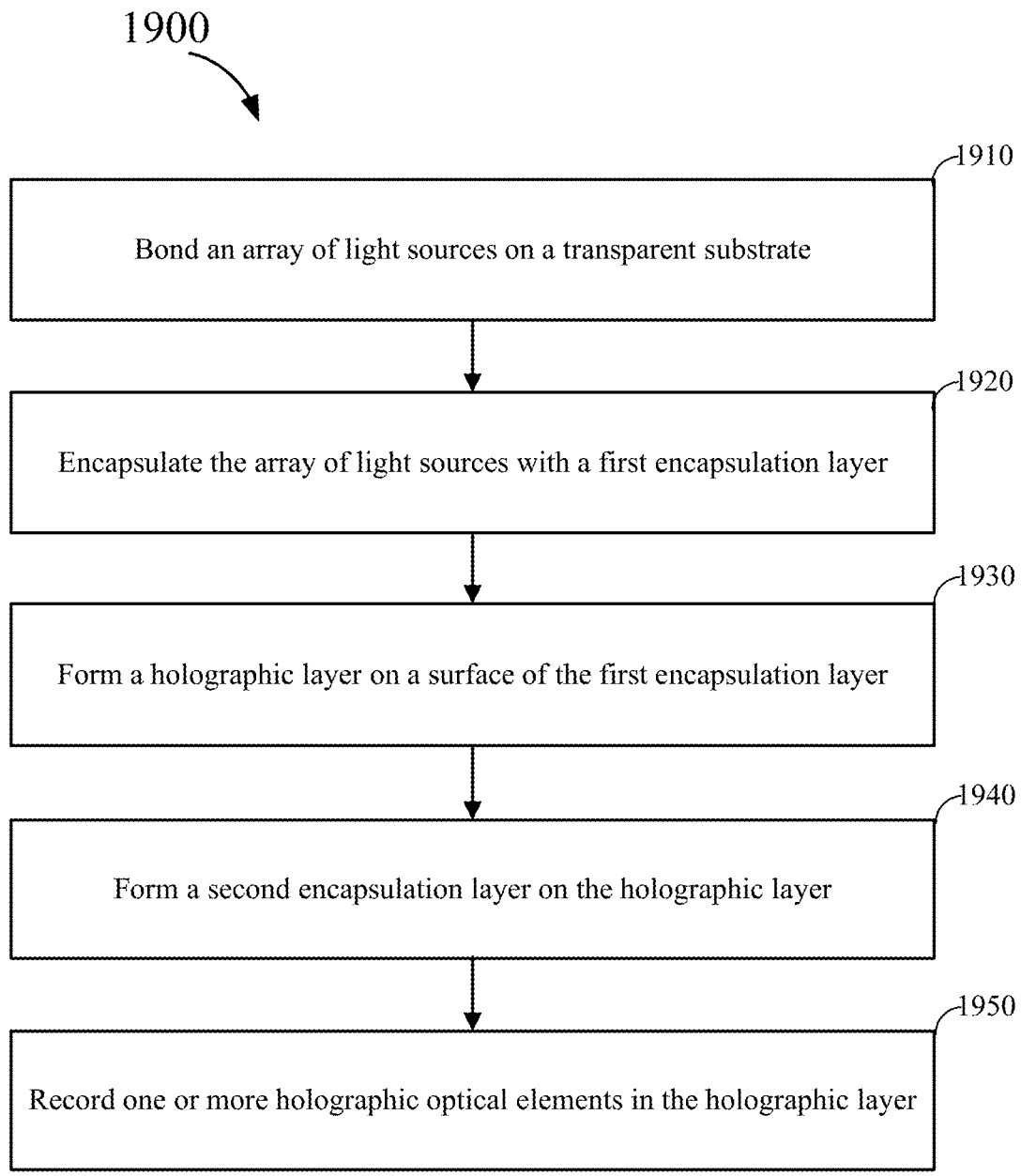
FIG. 19 is a simplified flow chart illustrating an example of a method of fabricating an eye illuminator for eye-tracking according to certain embodiments.

FIG. 19 is a simplified flow chart 1900 illustrating an example of a method of fabricating an eye illuminator for eye-tracking according to certain embodiments. The operations described in flow chart 1900 are for illustration purposes only and are not intended to be limiting. In various implementations, modifications may be made to flow chart 1900 to add additional operations, omit some operations, combine some operations, split some operations, or reorder some operations.

At block 1910, an array of light sources may optionally be bonded on a transparent substrate, such as a glass, quartz, polymer, ceramic, crystal, semiconductor (e.g., silicon), or plastic substrate. The transparent substrate may be transparent to both visible light and infrared light. In some embodiments, the transparent substrate may be a waveguide in a waveguide-based display and may be configured to guide display light within the substrate through total internal reflection. The array of light sources may include VCSELs or micro-LEDs, where a linear dimension of each light source may be less than about 200 μm. An emission cone of each light source may be within a 30° or 40° angle. The array of light sources may emit light in an infrared band, such as at 850 nm or 940 nm.

At block 1920, the array of light sources may be encapsulated with a first encapsulation layer. The first encapsulation layer may include, for example, a glass, quartz, polymer, ceramic, crystal, semiconductor, or plastic material. The first encapsulation layer may be formed on the array of light sources by, for example, coating or deposition. The first encapsulation layer may have a flat or a curved surface.

At block 1930, a holographic layer may be formed on a surface of the first encapsulation layer. In some embodiments, the holographic layer may include a photopolymer layer. The photopolymer layer may be sensitive to visible light or UV light and may be transparent to infrared light. In some embodiments, the photopolymer layer may be premade and may be conformally laminated on the first encapsulation layer. For example, in some embodiments, the photopolymer layer may be sandwiched by two flexible cover layers, where a first cover layer of the two flexible cover layers may be peeled off and the photopolymer layer and the second cover layer may be laminated on the first encapsulation layer using a roller. In some embodiments, the photopolymer layer may be coated or deposited on the first encapsulation layer. In some embodiments, the photopolymer layer may have a thickness greater than 10 µm, 15 µm, 20 µm, 25 µm, 30 µm, 40 µm, 50 µm, or thicker. In some embodiments, the maximum achievable refractive index modulation of the photopolymer layer is at least 0.02 or at least 0.03.

At block 1940, a second encapsulation layer may be optionally formed on the holographic layer. The second encapsulation layer may include, for example, a glass, quartz, polymer, ceramic, crystal, semiconductor, or plastic material. The second encapsulation layer may be formed on the holographic layer by, for example, lamination, coating, or deposition. In some embodiments, the encapsulation layer may be one of the cover layers described above with respect to block 1930. In some embodiments, the first encapsulation layer and the second encapsulation layer may have refractive indexes matching a refractive index of the holographic layer in the infrared light band, such as within about 5%, 10%, 20%, or 25% of the refractive index of the holographic layer.

At block 1950, one or more holographic optical elements may be recorded in the holographic layer. In some embodiments, the one or more holographic optical elements may be recorded in the holographic layer before laminating the holographic layer on the first encapsulation layer. The one or more HOEs may be recorded in the photopolymer layer using coherent light beams as described above. The coherent light beams may include visible light at, for example, 457 nm, 532 nm, or 660 nm. The one or more HOEs may be recorded in the photopolymer layer using multiple exposures or a single exposure. In some embodiments, the one or more HOEs may include at least one of a holographic grating (e.g., volume Bragg grating), a holographic lens, or a holographic diffuser. The one or more HOEs may be aligned with the array of light sources and may be configured to direct the infrared light emitted by the array of light sources to the eye of a user of a near-eye display device. For example, the holographic optical element may be configured to bend a chief ray from a light source in the array of light sources by at least 30°, at least 45°, or at least 60°. In some embodiments, the holographic optical element may be configured to expand the emission cone of a light source in the array of light sources to at least 50°, at least 70°, or at least 100°.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 20:
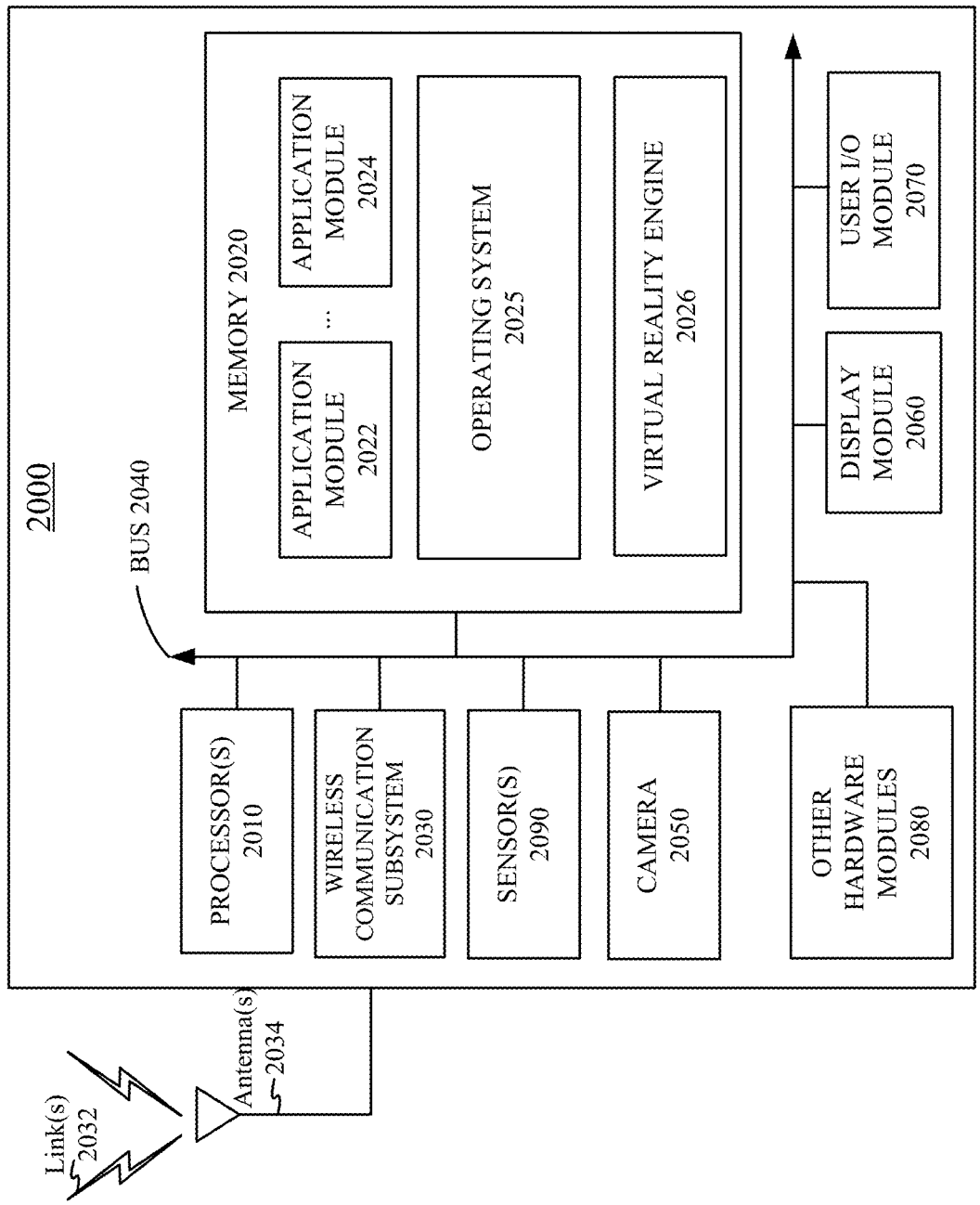
FIG. 20 is a simplified block diagram of an example of an electronic system 2100 of a near-eye display system (e.g., HMD device) for implementing some of the examples disclosed herein according to certain embodiments.

FIG. 20 is a simplified block diagram of an example of an electronic system 2000 of a near-eye display system (e.g., HMD device) for implementing some of the examples disclosed herein. Electronic system 2000 may be used as the electronic system of an HMD device or other near-eye displays described above. In this example, electronic system 2000 may include one or more processor(s) 2010 and a memory 2020. Processor(s) 2010 may be configured to execute instructions for performing operations at a number of components, and can be, for example, a general-purpose processor or microprocessor suitable for implementation within a portable electronic device. Processor(s) 2010 may be communicatively coupled with a plurality of components within electronic system 2000. To realize this communicative coupling, processor(s) 2010 may communicate with the other illustrated components across a bus 2040. Bus 2040 may be any subsystem adapted to transfer data within electronic system 2000. Bus 2040 may include a plurality of computer buses and additional circuitry to transfer data.

Memory 2020 may be coupled to processor(s) 2010. In some embodiments, memory 2020 may offer both short-term and long-term storage and may be divided into several units. Memory 2020 may be volatile, such as static random access memory (SRAM) and/or dynamic random access memory (DRAM) and/or non-volatile, such as read-only memory (ROM), flash memory, and the like. Furthermore, memory 2020 may include removable storage devices, such as secure digital (SD) cards. Memory 2020 may provide storage of computer-readable instructions, data structures, program modules, and other data for electronic system 2000. In some embodiments, memory 2020 may be distributed into different hardware modules. A set of instructions and/or code might be stored on memory 2020. The instructions might take the form of executable code that may be executable by electronic system 2000, and/or might take the form of source and/or installable code, which, upon compilation and/or installation on electronic system 2000 (e.g., using any of a variety of generally available compilers, installation programs, compression/decompression utilities, etc.), may take the form of executable code.

In some embodiments, memory 2020 may store a plurality of application modules 2022 through 2024, which may include any number of applications. Examples of applications may include gaming applications, conferencing applications, video playback applications, or other suitable applications. The applications may include a depth sensing function or eye-tracking function. Application modules 2022-2024 may include particular instructions to be executed by processor(s) 2010. In some embodiments, certain applications or parts of application modules 2022-2024 may be executable by other hardware modules 2080. In certain embodiments, memory 2020 may additionally include secure memory, which may include additional security controls to prevent copying or other unauthorized access to secure information.

In some embodiments, memory 2020 may include an operating system 2025 loaded therein. Operating system 2025 may be operable to initiate the execution of the instructions provided by application modules 2022-2024 and/or manage other hardware modules 2080 as well as interfaces with a wireless communication subsystem 2030 which may include one or more wireless transceivers. Operating system 2025 may be adapted to perform other operations across the components of electronic system 2000 including threading, resource management, data storage control and other similar functionality.

Wireless communication subsystem 2030 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2000 may include one or more antennas 2034 for wireless communication as part of wireless communication subsystem 2030 or as a separate component coupled to any portion of the system. Depending on desired functionality, wireless communication subsystem 2030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2030 may permit data to be exchanged with a network, other computer systems, and/or any other devices described herein. Wireless communication subsystem 2030 may include a means for transmitting or receiving data, such as identifiers of HMD devices, position data, a geographic map, a heat map, photos, or videos, using antenna(s) 2034 and wireless link(s) 2032. Wireless communication subsystem 2030, processor(s) 2010, and memory 2020 may together comprise at least a part of one or more of a means for performing some functions disclosed herein.

Embodiments of electronic system 2000 may also include one or more sensors 2090. Sensor(s) 2090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2090 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2000 may include a display module 2060. Display module 2060 may be a near-eye display, and may graphically present information, such as images, videos, and various instructions, from electronic system 2000 to a user. Such information may be derived from one or more application modules 2022-2024, virtual reality engine 2026, one or more other hardware modules 2080, a combination thereof, or any other suitable means for resolving graphical content for the user (e.g., by operating system 2025). Display module 2060 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 2000 may include a user input/output module 2070. User input/output module 2070 may allow a user to send action requests to electronic system 2000. An action request may be a request to perform a particular action. For example, an action request may be to start or end an application or to perform a particular action within the application. User input/output module 2070 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2000. In some embodiments, user input/output module 2070 may provide haptic feedback to the user in accordance with instructions received from electronic system 2000. For example, the haptic feedback may be provided when an action request is received or has been performed.

Electronic system 2000 may include a camera 2050 that may be used to take photos or videos of a user, for example, for tracking the user's eye position. Camera 2050 may also be used to take photos or videos of the environment, for example, for VR, AR, or MR applications. Camera 2050 may include, for example, a complementary metal-oxide-semiconductor (CMOS) image sensor with a few millions or tens of millions of pixels. In some implementations, camera 2050 may include two or more cameras that may be used to capture 3-D images.

In some embodiments, electronic system 2000 may include a plurality of other hardware modules 2080. Each of other hardware modules 2080 may be a physical module within electronic system 2000. While each of other hardware modules 2080 may be permanently configured as a structure, some of other hardware modules 2080 may be temporarily configured to perform specific functions or temporarily activated. Examples of other hardware modules 2080 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2080 may be implemented in software.

In some embodiments, memory 2020 of electronic system 2000 may also store a virtual reality engine 2026. Virtual reality engine 2026 may execute applications within electronic system 2000 and receive position information, acceleration information, velocity information, predicted future positions, or some combination thereof of the HMD device from the various sensors. In some embodiments, the information received by virtual reality engine 2026 may be used for producing a signal (e.g., display instructions) to display module 2060. For example, if the received information indicates that the user has looked to the left, virtual reality engine 2026 may generate content for the HMD device that mirrors the user's movement in a virtual environment. Additionally, virtual reality engine 2026 may perform an action within an application in response to an action request received from user input/output module 2070 and provide feedback to the user. The provided feedback may be visual, audible, or haptic feedback. In some implementations, processor(s) 2010 may include one or more GPUs that may execute virtual reality engine 2026.

In various implementations, the above-described hardware and modules may be implemented on a single device or on multiple devices that can communicate with one another using wired or wireless connections. For example, in some implementations, some components or modules, such as GPUs, virtual reality engine 2026, and applications (e.g., tracking applications), may be implemented on a console separate from the head-mounted display device. In some implementations, one console may be connected to or support more than one HMD.

In alternative configurations, different and/or additional components may be included in electronic system 2000. Similarly, functionality of one or more of the components can be distributed among the components in a manner different from the manner described above. For example, in some embodiments, electronic system 2000 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An eye-illumination system for eye-tracking in a near-eye display system, the eye-illumination system comprising:
    a substrate transparent to visible light, and configured to be placed in front of an eye of a user of the near-eye display system and be seen through by the eye of the user to view images behind the substrate;
    an array of light sources on the substrate and configured to emit infrared light, wherein light sources of the array of light sources are spaced apart from each other and are each characterized by a small form factor, such that the light sources are invisible to the eye of the user;
    a first encapsulation layer on the array of light sources and, in combination with the substrate, encapsulating the array of light sources; and
    an array of holographic optical elements conformally coupled to a surface of the first encapsulation layer, wherein:
        holographic optical elements in the array of holographic optical elements are spaced apart from each other,
        each holographic optical element of the array of holographic optical elements is on a respective light source of the array of light sources, and
        each holographic optical element of the array of holographic optical elements is configured to transmit the visible light without diffraction and diffract the infrared light emitted by the respective light source of the array of light sources to a respective direction towards the eye of the user for eye-tracking.

2. The eye-illumination system of claim 1, wherein each holographic optical element of the array of holographic optical elements includes at least one of a holographic grating, a holographic lens, or a holographic diffuser.

3. The eye-illumination system of claim 2, wherein the array of holographic optical elements includes an array of volume Bragg gratings, each volume Bragg grating in the array of volume Bragg gratings corresponding to a respective light source in the array of light sources.

4. The eye-illumination system of claim 3, wherein each volume Bragg grating in the array of volume Bragg gratings is characterized by a different respective diffraction angle.

5. The eye-illumination system of claim 1, wherein a holographic optical element of the array of holographic optical elements is configured to bend a chief ray from a light source in the array of light sources by at least 30°.

6. The eye-illumination system of claim 1, wherein the array of light sources includes a one-dimensional or two dimensional array of vertical-cavity surface-emitting lasers or micro light emitting diodes.

7. The eye-illumination system of claim 1, wherein a distance between the array of holographic optical elements and the array of light sources is less than 1 mm.

8. The eye-illumination system of claim 1, wherein each light source in the array of light sources is characterized by a linear dimension less than 200 μm.

9. The eye-illumination system of claim 1, wherein each light source in the array of light sources is characterized by an emission cone with an angle range less than 40°.

10. The eye-illumination system of claim 9, wherein a holographic optical element of the array of holographic optical elements is configured to expand the angle range of the emission cone of a light source in the array of light sources to at least 50°.

11. The eye-illumination system of claim 1, wherein the array of holographic optical elements includes a photopolymer layer that is configured to be laminated on the surface of the first encapsulation layer.

12. The eye-illumination system of claim 1, further comprising a second encapsulating layer encapsulating the array of holographic optical elements, wherein the first encapsulation layer and the second encapsulation layer have refractive indexes matching a refractive index of the array of holographic optical elements for the infrared light.

13. The eye-illumination system of claim 1, wherein the substrate comprises at least one of a glass, quartz, plastic, polymer, ceramic, crystal, or semiconductor substrate, and wherein the surface of the first encapsulation layer includes a curved or flat surface.

14. A near-eye display system comprising an eye illuminator for eye-tracking, the eye illuminator comprising:
    an array of light sources configured to emit infrared light, wherein light sources of the array of light sources are spaced apart from each other and are each characterized by a small form factor, such that the light sources are invisible to an eye of a user of the near-eye display system;
    a substrate and a first encapsulating layer encapsulating the array of light sources, the substrate and the first encapsulating layer positioned in a field of view of the eye of the user and being transparent to at least visible light; and
    an array of holographic optical elements conformally coupled to a surface of the first encapsulation layer, wherein:
        holographic optical elements in the array of holographic optical elements are spaced apart from each other,
        each holographic optical element of the array of holographic optical elements is on a respective light source of the array of light sources, and
        each holographic optical element of the array of holographic optical elements is configured to diffract the infrared light emitted by the respective light source of the array of light sources to a respective direction towards the eye of the user for eye-tracking.

15. The near-eye display system of claim 14, wherein a distance between the array of holographic optical elements and the array of light sources is less than 1 mm.

16. The near-eye display system of claim 14, wherein each holographic optical element of the array of holographic optical elements includes at least one of a holographic grating, a holographic lens, or a holographic diffuser.

17. The near-eye display system of claim 14, wherein each light source in the array of light sources is characterized by a linear dimension less than 200 µm.

18. The near-eye display system of claim 14, wherein a holographic optical element of the array of holographic optical elements is configured to bend a chief ray from a light source in the array of light sources by at least 30°.

19. The near-eye display system of claim 14, wherein:
- each light source in the array of light sources is characterized by an emission cone with an angle range less than 40°; and
- a holographic optical element of the array of holographic optical elements is configured to expand the angle range of the emission cone of a light source in the array of light sources to at least 50°.

20. The near-eye display system of claim 14, wherein the eye illuminator further comprises a second encapsulating layer encapsulating the array of holographic optical elements, and wherein the first encapsulation layer and the second encapsulation layer have refractive indexes matching a refractive index of the array of holographic optical elements for the infrared light.

\* \* \* \* \*